US012505799B2

(12) United States Patent
Park et al.

(10) Patent No.: US 12,505,799 B2
(45) Date of Patent: Dec. 23, 2025

(54) DISPLAY DEVICE HAVING REDUCED AFTERIMAGE DEFECTS

(71) Applicant: Samsung Display Co., Ltd., Yongin-si (KR)

(72) Inventors: Juchan Park, Yongin-si (KR); Yoomin Ko, Yongin-si (KR); Sunho Kim, Yongin-si (KR); Hyewon Kim, Yongin-si (KR); Yerim Son, Yongin-si (KR); Pilsuk Lee, Yongin-si (KR); Chung Sock Choi, Yongin-si (KR); Sungjin Hong, Yongin-si (KR)

(73) Assignee: Samsung Display Co., LTD., Gyeonggi-do (KR)

( * ) Notice: Subject to any disclaimer, the term of this patent is extended or adjusted under 35 U.S.C. 154(b) by 0 days.

(21) Appl. No.: 18/585,373

(22) Filed: Feb. 23, 2024

(65) Prior Publication Data

US 2024/0290267 A1 Aug. 29, 2024

(30) Foreign Application Priority Data

Feb. 24, 2023 (KR) ........................ 10-2023-0025372

(51) Int. Cl.
*G09G 3/3233* (2016.01)

(52) U.S. Cl.
CPC ... *G09G 3/3233* (2013.01); *G09G 2320/0257* (2013.01)

(58) Field of Classification Search
CPC ..................... G09G 3/3233; G09G 2320/0257
See application file for complete search history.

(56) References Cited

U.S. PATENT DOCUMENTS

2020/0136088 A1 * 4/2020 Yang .................... G09G 3/3225

FOREIGN PATENT DOCUMENTS

CN 114171566 3/2022

* cited by examiner

*Primary Examiner* — Yaron Cohen
(74) *Attorney, Agent, or Firm* — HARNESS, DICKEY & PIERCE, P.L.C.

(57) ABSTRACT

A display device including a base layer, a plurality of voltage lines and a transistor that are disposed on the base layer, a light emitting element electrically connected to the transistor and including a cathode, and a connection wiring line electrically connected to the light emitting element and including a first connection part spaced apart from a light emitting opening defined in the light emitting element, and a second connection part electrically connected to the transistor. The first connection part overlaps some of the plurality of voltage lines in plan view.

21 Claims, 17 Drawing Sheets

DISPLAY DEVICE HAVING REDUCED AFTERIMAGE DEFECTS

CROSS-REFERENCE TO RELATED APPLICATION(S)

This application claims priority to and benefits of Korean Patent Application No. 10-2023-0025372 under 35 U.S.C. § 119, filed on Feb. 24, 2023, in the Korean Intellectual Property Office, the entire contents of which are incorporated herein by reference.

BACKGROUND

1. Technical Field

Embodiments of the disclosure relate to a display device having reduced afterimage defects.

2. Description of the Related Art

Multimedia electronic devices such as a television (TV), a mobile phone, a tablet, computer, a navigation system, and a game console include display panels for displaying images.

The display panel may include light emitting elements and circuits for driving the light emitting elements. The light emitting elements included in the display panel emit light beams and generate images according to a voltage applied from the circuits. Research on connection between a light emitting element and a circuit has been conducted to improve the reliability of the display panel.

SUMMARY

Embodiments of the disclosure provide a display device having reduced afterimage defects.

According to an embodiment, a display device may include a base layer, a plurality of voltage lines and a transistor that are disposed on the base layer, a light emitting element electrically connected to the transistor and including a cathode, and a connection wiring line electrically connected to the light emitting element and including a first connection part spaced apart from a light emitting opening defined in the light emitting element, and a second connection part electrically connected to the transistor. The first connection part may overlap some of the plurality of voltage lines in plan view.

The connection wiring line may include a first layer, a second layer disposed on the first layer, and a third layer disposed on the second layer. The third layer may include a tip portion protruding from a side surface of the second layer, and the cathode may be electrically disconnected by the tip portion.

The first connection part may include a plurality of side surfaces, and at least one side surface of the plurality of side surfaces may be electrically connected to the cathode.

The display device may further include a lower insulating layer which is disposed on the transistor and in which a lower opening that does not overlap the connection wiring line in plan view is defined.

The first layer may include an upper surface parallel to the base layer, an inclined surface extending from the upper surface and inclined with respect to the base layer, and a first side surface extending from the inclined surface and extended to the lower insulating layer.

The lower insulating layer may include a lower surface parallel to the base layer, and a second side surface extending from the lower surface and extended to the connection wiring line, and the second side surface of the lower insulating layer and the first side surface of the first layer of the connection wiring line may be aligned with each other.

The display device may further include an upper insulating layer which is disposed on the lower insulating layer and in which a first opening overlapping the at least one side surface is defined.

One side surface among the plurality of side surfaces may be exposed through the first opening.

Two side surfaces among the plurality of side surfaces may be exposed through the first opening, and the two side surfaces may be spaced apart from each other in a first direction and extend in a second direction intersecting the first direction.

The display device may further include a capping pattern disposed on the transistor and electrically contacting the connection wiring line.

The plurality of voltage lines may include a first power line, a second power line, a reference voltage line, a first initialization power line, a second initialization power line, a compensation voltage line, and a data line.

Each of the plurality of voltage lines may have a width parallel to a first direction, each of the plurality of voltage lines may include a side extending in a second direction intersecting the first direction, and the first connection part may overlap the side of one voltage line among the plurality of voltage lines in plan view.

According to an embodiment, a display device may include a base layer, a plurality of voltage lines and a transistor that are disposed on the base layer, a light emitting element electrically connected to the transistor and including a cathode, a connection wiring line electrically connected to the transistor and the light emitting element and including a first layer, a second layer disposed on the first layer, and a third layer disposed on the second layer, and a lower insulating layer which is disposed on the transistor and in which a lower opening that does not overlap the connection wiring line in plan view is defined. The third layer may include a tip portion protruding from a side surface of the second layer, and the first layer may include an upper surface parallel to the base layer, an inclined surface extending from the upper surface and inclined with respect to the base layer, and a first side surface extending from the inclined surface and extended to the lower insulating layer.

The lower insulating layer may include a lower surface parallel to the base layer, and a second side surface extending from the lower surface and extended to the connection wiring line, and the second side surface of the lower insulating layer and the first side surface of the first layer of the connection wiring line may be aligned with each other.

The connection wiring line may include a first connection part spaced apart from a light emitting opening defined in the light emitting element and a second connection part electrically connected to the transistor, and the first connection part may include a plurality of side surfaces, and at least one side surface among the plurality of side surfaces may be electrically connected to the cathode.

The display device may further include an upper insulating layer which is disposed on the lower insulating layer and in which a first opening overlapping the at least one side surface is defined.

One side surface among the plurality of side surfaces may be exposed through the first opening.

Two side surfaces among the plurality of side surfaces may be exposed through the first opening, and the two side surfaces may be spaced apart from each other in a first direction and extend in a second direction intersecting the first direction.

Each of the plurality of voltage lines may have a width parallel to a first direction, each of the plurality of voltage lines may include a side extending in a second direction intersecting the first direction, and the first connection part may overlap the side of one voltage line among the plurality of voltage lines in plan view.

The first connection part may overlap some of the plurality of voltage lines in plan view.

BRIEF DESCRIPTION OF THE DRAWINGS

The above and other objects and features of the disclosure will become apparent by describing in detail embodiments thereof with reference to the accompanying drawings.

DETAILED DESCRIPTION OF THE EMBODIMENTS

Figure 1:
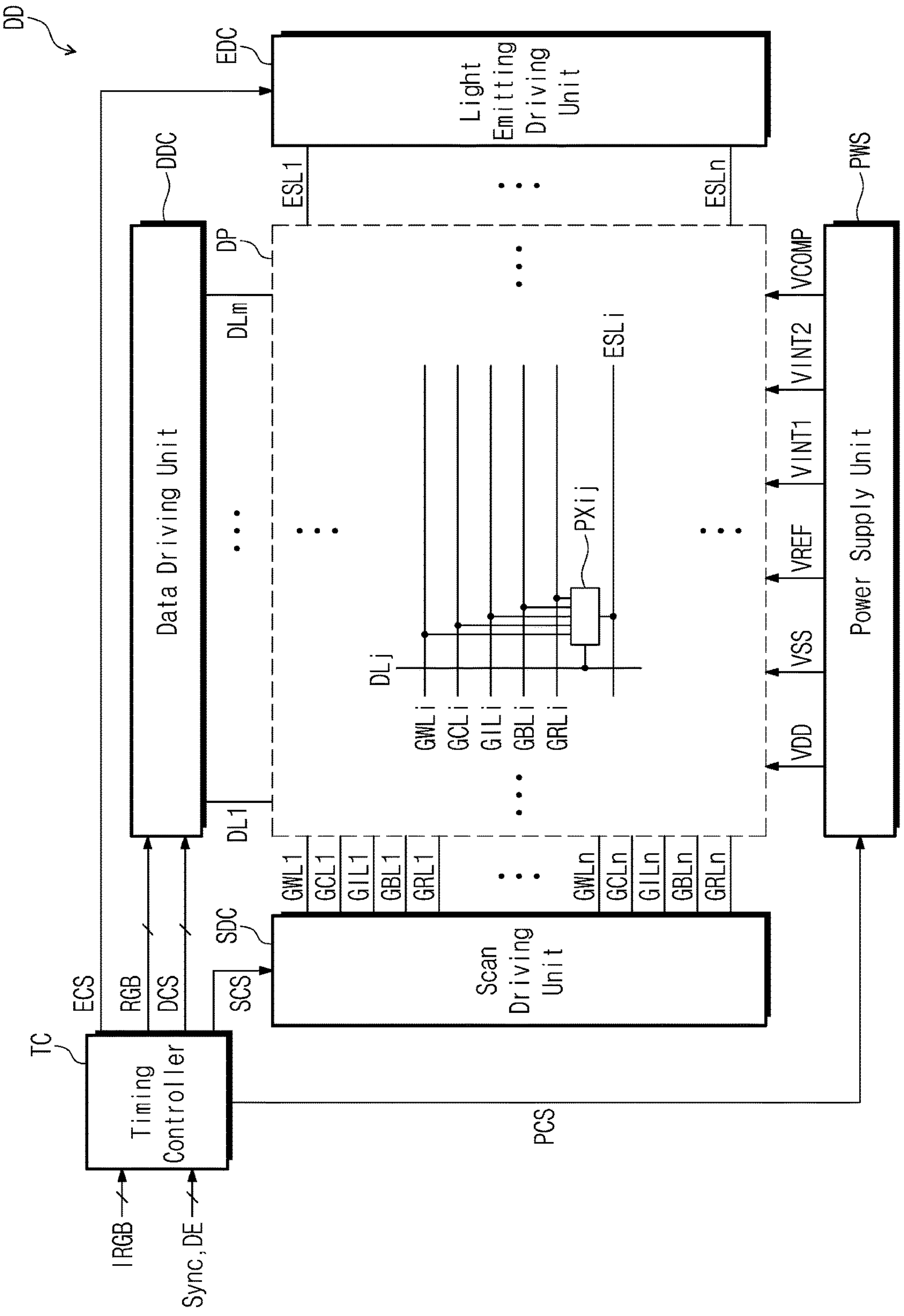
FIG. 1 is a schematic block diagram of a display device according to an embodiment of the disclosure.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art. The same reference numerals refer to the same components.

In the specification, the expression that a first component (or area, layer, part, portion, etc.) is "on", "connected with", or "coupled to" a second component means that the first component is directly on, connected with, or coupled to the second component or means that one or more additional components may be interposed therebetween.

It will be understood that the terms "connected to" or "coupled to" may include a physical and/or electrical connection or coupling.

Further, in the drawings, the thickness, the ratio, and the dimension of components may be exaggerated for effective description of technical contents.

In the specification and the claims, the term "and/or" is intended to include any combination of the terms "and" and "or" for the purpose of its meaning and interpretation. For example, "A and/or B" may be understood to mean any combination including "A, B, or A and B." The terms "and" and "or" may be used in the conjunctive or disjunctive sense and may be understood to be equivalent to "and/or."

Although the terms "first", "second", etc. may be used to describe various components, the components should not be limited by the terms. The terms are only used to distinguish one component from another component. For example, without departing from the scope of the disclosure, a first component may be referred to as a second component, and similarly, the second component may be also referred to as the first component.

As used herein, the singular forms, "a," "an," and "the" are intended to include the plural forms as well, unless the context clearly indicates otherwise.

Also, the terms "under", "below", "on", "above", etc. are used to describe the correlation of components illustrated in drawings. The terms that are relative in concept are described based on a direction illustrated in drawings.

It will be understood that the terms "include", "comprise", "have", etc. specify the presence of features, numbers, steps, operations, elements, or components, described in the specification, or a combination thereof, and do not exclude in advance the presence or additional possibility of one or more other features, numbers, steps, operations, elements, or components or a combination thereof.

Terms "part" and "unit" mean a software component or hardware component that performs a specific function. The hardware component may include, for example, a field-programmable gate array (FPGA) or an application-specific integrated circuit (ASIC). The software component may refer to an executable code and/or data used by the executable code in an addressable storage medium. Thus, the software components may be, for example, object-oriented software components, class components, and task components, and may include processes, functions, attributes, procedures, subroutines, program code segments, drivers, firmware, microcodes, circuits, data, database, data structures, tables, arrays, and/or variables.

The term "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as "not overlapping" or to "not overlap" another element, this may include that the elements are spaced apart from each other, offset from each other, or set aside from each other or any other suitable term as would be appreciated and understood by those of ordinary skill in the art.

Unless otherwise defined or implied, all terms (including technical terms and scientific terms) used in the specification have the same meaning as commonly understood by those skilled in the art to which the disclosure belongs. Further-more, terms such as terms defined in the dictionaries commonly used should be interpreted as having a meaning consistent with the meaning in the context of the related technology, and should not be interpreted in overly ideal or overly formal meaning unless explicitly defined herein.

FIG. 1 is a schematic block diagram of a display device DD according to an embodiment of the disclosure.

Referring to FIG. 1, the display device DD may include a display panel DP, panel driving units SDC, EDC, and DDC, a power supply unit PWS, and a timing controller TC. In an embodiment, the display panel DP is described as a light emitting display panel. The light emitting display panel may include an organic light emitting display panel, an inorganic light emitting display panel, or a quantum dot light emitting display panel. The organic light emitting display panel will be described in detail as an example. The panel driving unit may include the scan driving unit SDC, the light emitting driving unit EDC, and the data driving unit DDC.

The display panel DP may include scan lines GWL1 to GWLn, GCL1 to GCLn, GIL1 to GILn, GBL1 to GBLn, and GRL1 to GRLn, light emitting lines ESL1 to ESLn, and data lines DL1 to DLm. The display panel DP may include pixels connected to the scan lines GWL1 to GWLn, GCL1 to GCLn, GIL1 to GILn, GBL1 to GBLn, and GRL1 to GRLn, the light emitting lines ESL1 to ESLn, and the data lines DL1 to DLm (wherein, m and n are integers greater than 1).

For example, a pixel PXij (wherein i and j are integers greater than 1) positioned at an $i^{th}$ horizontal line (or a $i^{th}$ pixel row) and a $j^{th}$ vertical line (or a $j^{th}$ pixel column) may be connected to an $i^{th}$ first scan line (or a writing scan line GWLi), an $i^{th}$ second scan line (or a compensation scan line GCLi), an $i^{th}$ third scan line (or a first initialization scan line GILi), an $i^{th}$ fourth scan line (or a second initialization scan line GBLi), an $i^{th}$ fifth scan line (or a reset scan line GRLi), a $j^{th}$ data line DLj, and an $i^{th}$ light emitting line ESLi.

The pixel Pxij may include light emitting elements, transistors, and capacitors. The pixel Pxij may receive, through the power supply unit PWS, a first power voltage VDD, a second power voltage VSS, a third power voltage (or a reference voltage VREF), a fourth power voltage (or a first initialization voltage VINT1), a fifth power voltage (or a second initialization voltage VINT2), and a sixth power voltage (or a compensation voltage VCOMP).

Voltage values of the first power voltage VDD and the second power voltage VSS may be set so that a current flows in the light emitting element to emit a light beam. For example, the first power voltage VDD may be set to a higher voltage than the second power voltage VSS.

The third power voltage VREF may be a voltage for initializing a gate of a driving transistor included in the pixel Pxij. The third power voltage VREF may be used to implement a predetermined or selected grayscale using a voltage difference between the third power voltage VREF and a data signal. To this end, the third power voltage VREF may be set to a predetermined or selected voltage within a voltage range of the data signal.

The fourth power voltage VINT1 may be a voltage for initializing a capacitor included in the pixel Pxij. The fourth power voltage VINT1 may be set to a lower voltage than the third power voltage VREF. For example, the fourth power voltage VINT1 may be set to a voltage lower than a difference between the third power voltage VREF and a threshold voltage of the driving transistor. However, the disclosure is not limited thereto.

The fifth power voltage VINT2 may be a voltage for initializing a cathode of the light emitting element included in the pixel Pxij. The fifth power voltage VINT2 may be set to a voltage lower than the first power voltage VDD or the fourth power voltage VINT1 or may be set to a voltage similar or equal to the third power voltage VREF, but the disclosure is not limited thereto, and the fifth power voltage VINT2 may be also set to a voltage similar or equal to the first power voltage VDD.

The sixth power voltage VCOMP may supply a predetermined or selected current to the driving transistor in case that the threshold voltage of the driving transistor is compensated for.

FIG. 1 illustrates that all the first to sixth power voltages VDD, VSS, VREF, VINT1, VINT2, and VCOMP are supplied from the power supply unit PWS, but the disclosure is not limited thereto. For example, both the first power voltage VDD and the second power voltage VSS may be supplied regardless of a structure of the pixel Pxij, and at least one of the third power voltage VREF, the fourth power voltage VINT1, the fifth power voltage VINT2, and the sixth power voltage VCOMP may not be supplied to correspond to the structure of the pixel Pxij.

In an embodiment of the disclosure, signal lines connected to the pixel Pxij may be variously set to correspond to a circuit structure of the pixel Pxij.

The scan driving unit SDC may receive a first control signal SCS from the timing controller TC and may supply, on the basis of the first control signal SCS, a scan signal to the first scan lines GWL1 to GWLn, the second scan lines GCL1 to GCLn, the third scan lines GIL1 to GILn, the fourth scan lines GBL1 to GBLn, and the fifth scan lines GRL1 to GRLn.

The scan signal may be set to a voltage at which transistors that receive the scan signal may be turned on. For example, the scan signal supplied to a P-type transistor may be set to a logic low level, and the scan signal supplied to an N-type transistor may be set to a logic high level. Hereinafter, the wording “the scan signal is supplied” may be understood as that the scan signal is supplied at a logic level at which the transistor controlled by the scan signal is turned on.

In FIG. 1, for convenience of description, the scan driving unit SDC is illustrated as a single configuration, but the disclosure is not limited thereto. According to an embodiment, multiple scan driving units may be included to supply the scan signal to the first scan lines GWL1 to GWLn, the second scan lines GCL1 to GCLn, the third scan lines GIL1 to GILn, the fourth scan lines GBL1 to GBLn, and the fifth scan lines GRL1 to GRLn.

The light emitting driving unit EDC may supply a light emitting signal to the light emitting lines ESL1 to ESLn on the basis of a second control signal ECS. For example, the light emitting signal may be sequentially supplied to the light emitting lines ESL1 to ESLn.

Transistors connected to the light emitting lines ESL1 to ESLn according to the disclosure may be configured as N-type transistors. The light emitting signal supplied to the light emitting lines ESL1 to ESLn may be set to a gate-off voltage. The transistors that receive the light emitting signal may be turned off in case that the light emitting signal is supplied and may be turned on in other cases.

The second control signal ECS may include a light emitting start signal and clock signals, and the light emitting driving unit EDC may be implemented as a shift register that sequentially shifts the light emitting start signal having a pulse form using the clock signals to sequentially generate and output the light emitting signal having a pulse form.

The data driving unit DDC may receive a third control signal DCS and image data RGB from the timing controller TC. The data driving unit DDC may convert the image data RGB having a digital form into an analog data signal (i.e., a data signal). The data driving unit DDC may supply the data signal to the data lines DL1 to DLm to correspond to the third control signal DCS.

The third control signal DCS may include a data enable signal, a horizontal start signal, a data clock signal, and the like that instruct output of a valid data signal. For example, the data driving unit DDC may include a shift register that generates a sampling signal by shifting the horizontal start signal in synchronization of the data clock signal, a latch that latches the image data RGB in response to the sampling signal, a digital-to-analog converter (or a decoder) that converts the latched image data (for example, data having a digital form) into analog data signals, and buffers (or amplifiers) that output the data signals to the data lines DL1 to DLm.

The power supply unit PWS may supply, to the display panel DP, the first power voltage VDD, the second power voltage VSS, and the third power voltage VREF for driving the pixel Pxij. Further, the power supply unit PWS may supply at least one of the fourth power voltage VINT1, the fifth power voltage VINT2, and the sixth power voltage VCOMP to the display panel DP.

Figure 2A:
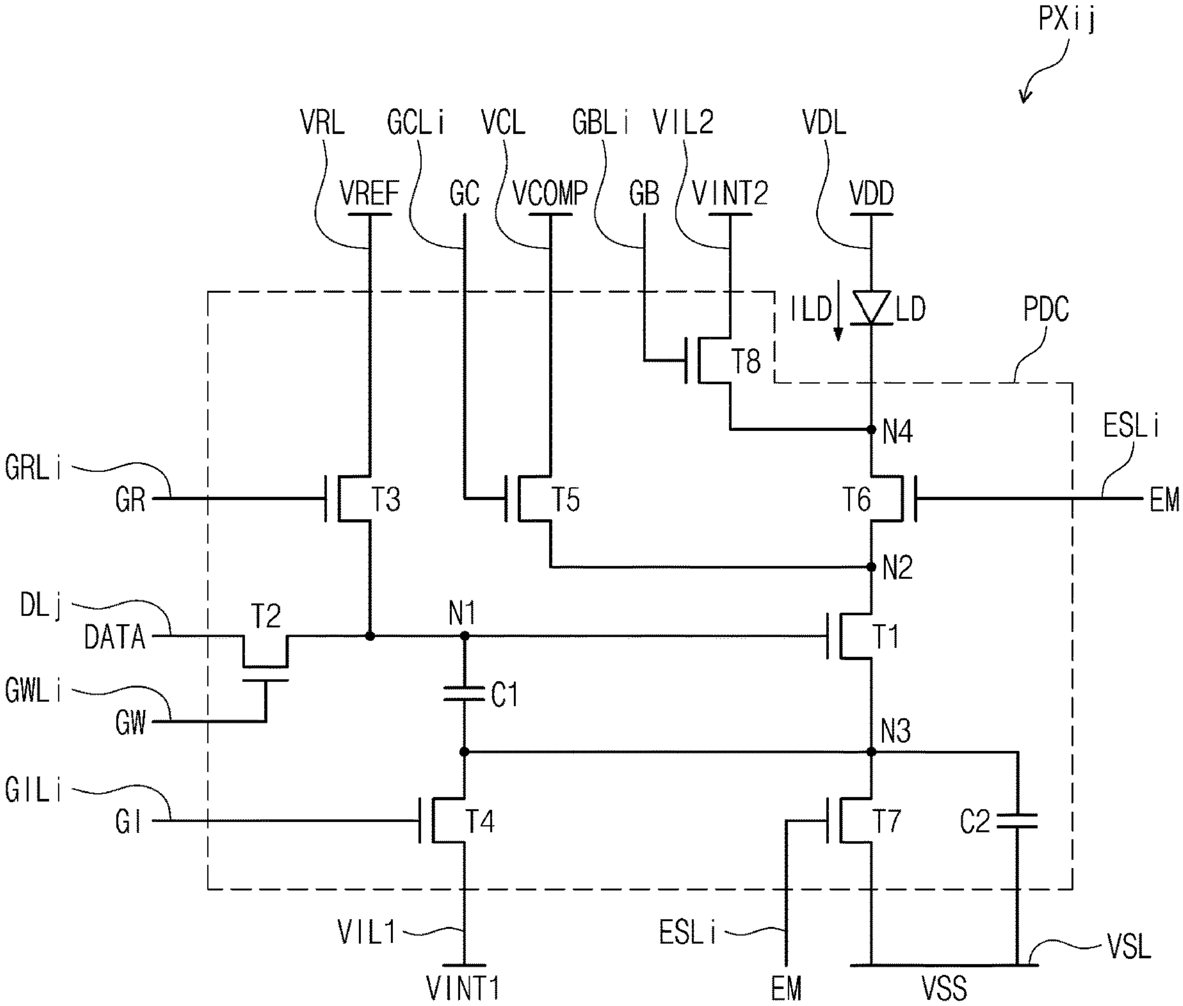
FIGS. 2A and 2B are schematic diagrams of equivalent circuits of pixels according to an embodiment.

For example, the power supply unit PWS may supply the first power voltage VDD, the second power voltage VSS, the third power voltage VREF, the fourth power voltage VINT1, the fifth power voltage VINT2, and the sixth power voltage VCOMP to the display panel DP via a first power line VDL (see FIG. 2A), a second power line VSL (see FIG. 2A), a third power line (or a reference voltage line VRL; see FIG. 2A), a fourth power line (or a first initialization voltage line VIL1; see FIG. 2A), a fifth power line (or a second initialization voltage line VIL2; see FIG. 2A), and a sixth power line (or a compensation voltage line VCL; see FIG. 2A).

The power supply unit PWS may be implemented as a power management integrated circuit, but the disclosure is not limited thereto.

The timing controller TC may generate the first control signal SCS, the second control signal ECS, the third control signal DCS, and a fourth control signal PCS on the basis of input image data IRGB, a synchronization signal Sync (e.g., a vertical sync signal, a horizontal sync signal, and the like), a data enable signal DE, a clock signal, and the like. The first control signal SCS may be supplied to the scan driving unit SDC, the second control signal ECS may be supplied to the light emitting driving unit EDC, the third control signal DCS may be supplied to the data driving unit DDC, and the fourth control signal PCS may be supplied to the power supply unit PWS. The timing controller TC may rearrange the input image data IRGB to correspond to the arrangement of the pixel Pxij in the display panel DP to generate the image data RGB (or frame data).

The scan driving unit SDC, the light emitting driving unit EDC, the data driving unit DDC, the power supply unit PWS, and/or the timing controller TC may be directly formed in the display panel DP or provided in the form of a separate driving chip and thus may be connected to the display panel DP. Further, at least two of the scan driving unit SDC, the light emitting driving unit EDC, the data driving unit DDC, the power supply unit PWS, and the timing controller TC may be provided as one driving chip. For example, the data driving unit DDC and the timing controller TC may be provided as one driving chip.

Hereinabove, the display device DD according to an embodiment has been described with reference to FIG. 1, but the display device DD according to the disclosure is not limited thereto. Signal lines may be further added or omitted according to the configuration of the pixel. Further, a connection relationship between one pixel and signal lines may be changed. In case that one of the signal lines is omitted, the omitted signal line may be replaced with another signal line.

Figure 2B:
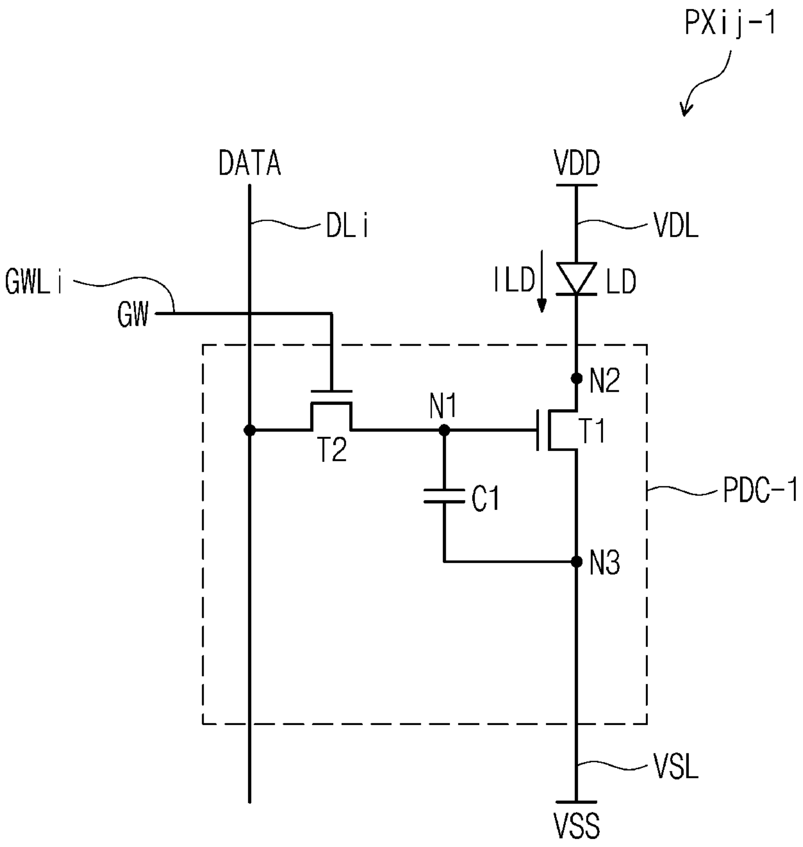

FIGS. 2A and 2B are schematic diagrams of equivalent circuits of pixels according to an embodiment. FIGS. 2A and 2B illustrate equivalent circuit diagrams of the pixels PXij and PXij-1 connected to the $i^{th}$ first scan line GWLi (hereinafter, referred to as a first scan line) and the $j^{th}$ data line DLj (hereinafter, referred to as a data line).

As illustrated in FIG. 2A, the pixel PXij may include a light emitting element LD and a pixel driving unit PDC. The light emitting element LD may be connected to the first power line VDL and the pixel driving unit PDC.

The pixel driving unit PDC may be connected to the scan lines GWLi, GCLi, GILi, GBLi, and GRLi, the data line DLj, the light emitting line ESLi, and the power voltage lines VDL, VSL, VIL1, VIL2, VRL, and VCL. The pixel driving unit PDC may include first to eighth transistors T1, T2, T3, T4, T5, T6, T7, and T8, a first capacitor C1, and a second capacitor C2. Hereinafter, a case in which all the first to eighth transistors T1, T2, T3, T4, T5, T6, T7, and T8 are N-type transistors will be described as an example. However, the disclosure is not limited thereto. Some of the first to eighth transistors T1 to T8 may be N-type transistors, and the others may be P-type transistors. All the first to eighth transistors T1 to T8 may be P-type transistors. The disclosure is not limited to an embodiment.

A gate of the first transistor T1 may be connected to a first node N1. A first electrode of the first transistor T1 may be connected to a second node N2, and a second electrode thereof may be connected to a third node N3. The first transistor T1 may be a driving transistor. The first transistor T1 may control a driving current ILD flowing from the first power line VDL via the light emitting element LD to the second power line VSL to correspond to a voltage of the first node N1. The first power voltage VDD may be set to a voltage having a higher potential than that of the second power voltage VSS.

In the specification, the wording "electrically connected between the transistor and the signal line or between the transistor and the transistor" means that "a source, a drain, and a gate of the transistor have an integral shape with a signal line or are connected through a connection electrode".

The second transistor T2 may include a gate connected to the writing scan line GWLi, a first electrode connected to the data line DLj, and a second electrode connected to the first node N1. The second transistor T2 may supply a data signal DATA to the first node N1 in response to a writing scan signal GW transmitted through the writing scan line GWLi. The second transistor T2 may be turned on in case that the writing scan signal GW is supplied to the writing scan line GWLi and thus electrically connect the data line DLj and the first node N1.

The third transistor T3 may be connected between the first node N1 and the reference voltage line VRL. A first electrode of the third transistor T3 may receive the reference voltage VREF through the reference voltage line VRL, and a second electrode of the third transistor T3 may be connected to the first node N1. In an embodiment, a gate of the third transistor T3 may receive a reset scan signal GR through the $i^{th}$ fifth scan line GRLi (hereinafter, referred to as a fifth scan line). The third transistor T3 may be turned on in case that the reset scan signal GR is supplied to the reset scan line GRLi and thus provide the reference voltage VREF to the first node N1.

The fourth transistor T4 may be connected between the third node N3 and the first initialization voltage line VIL1. A first electrode of the fourth transistor T4 may be connected to the third node N3, and a second electrode of the fourth transistor T4 may be connected to the first initialization voltage line VIL1 that provides the first initialization voltage VINT1. The fourth transistor T4 may be referred to as a first initialization transistor. A gate of the fourth transistor T4 may receive a first initialization scan signal GI through the $i^{th}$ third scan line GILi (hereinafter, referred to as a third scan line). The fourth transistor T4 may be turned on in case that the first initialization scan signal GI is supplied to the first initialization scan line GILi and supply the first initialization voltage VINT1 to the third node N3.

The fifth transistor T5 may be connected between the compensation voltage line VCL and the second node N2. A first electrode of the fifth transistor T5 may receive the compensation voltage VCOMP through the compensation voltage line VCL, and a second electrode of the fifth transistor T5 is connected to the second node N2 and electrically connected to the first electrode of the first transistor T1. A gate of the fifth transistor T5 may receive a compensation scan signal GC through the $i^{th}$ second scan line GCLi (hereinafter, referred to as a second scan line). The fifth transistor T5 may be turned on in case that the compensation scan signal GC is supplied to the compensation scan line GCLi and provide the compensation voltage VCOMP to the second node N2, and a threshold voltage of the first transistor T1 may be compensated for during a compensation period.

The sixth transistor T6 may be connected between the first transistor T1 and the light emitting element LD. In detail, a gate of the sixth transistor T6 may receive a light emitting signal EM through the $i^{th}$ light emitting line ESLi (hereinafter, referred to as a light emitting line). A first electrode of the sixth transistor T6 may be connected to the cathode of the light emitting element LD through a fourth node N4, and a second electrode of the sixth transistor T6 may be connected to the first electrode of the first transistor T1 through the second node N2. The sixth transistor T6 may be referred to as a first light emitting control transistor. In case that the light emitting signal EM is supplied to the light emitting line ESLi, the sixth transistor T6 may be turned on to electrically connect the light emitting element LD and the first transistor T1.

The seventh transistor T7 may be connected between the second power line VSL and the third node N3. A first electrode of the seventh transistor T7 may be connected to the second electrode of the first transistor T1 through the third node N3, and a second electrode of the seventh transistor T7 may receive the second power voltage VSS through the second power line VSL. A gate of the seventh transistor T7 may be electrically connected to the light emitting line ESLi. The seventh transistor T7 may be referred to as a second light emitting control transistor. In case that the light emitting signal EM is supplied to the light emitting line ESLi, the seventh transistor T7 may be turned on to electrically connect the second electrode of the first transistor T1 and the second power line VSL.

In an embodiment, it is illustrated that the sixth transistor T6 and the seventh transistor T7 are connected to the same light emitting line ESLi and are turned on through the same light emitting signal EM, but this is only an example, and the sixth transistor T6 and the seventh transistor T7 may be independently turned on by different signals that are distinct from each other. Further, in an embodiment of the disclosure, in the pixel driving unit PDC, any one of the sixth transistor T6 and the seventh transistor T7 may be omitted.

The eighth transistor T8 may be connected between the second initialization voltage line VIL2 and the fourth node N4. For example, the eighth transistor T8 may include a gate connected to the $i^{th}$ fourth scan line GBLi (hereinafter, a fourth scan line), a first electrode connected to the second initialization voltage line VIL2, and a second electrode connected to the fourth node N4. The eighth transistor T8 may be referred to as a second initialization transistor. The eighth transistor T8 may supply the second initialization voltage VINT2 to the fourth node N4 corresponding to the cathode of the light emitting element LD in response to a second initialization scan signal GB transmitted through the second initialization scan line GBLi. The cathode of the light emitting element LD may be initialized by the second initialization voltage VINT2.

In an embodiment, some of the second to eighth transistors T2, T3, T4, T5, T6, T7, and T8 may be simultaneously turned on through the same scan signal. For example, the eighth transistor T8 and the fifth transistor T5 may be simultaneously turned on through the same scan signal. For example, the eighth transistor T8 and the fifth transistor T5 may be operated by the same compensation scan signal GC. The eighth transistor T8 and the fifth transistor T5 may be simultaneously turned on/off by the same compensation scan signal GC. The compensation scan line GCLi and the second initialization scan line GBLi may be substantially provided as a single scan line. Accordingly, the initialization of the cathode of the light emitting element LD and compensation of the threshold voltage of the first transistor T1 may be performed at the same timing. However, this is only an example, and the disclosure is not limited to an embodiment.

Further, according to the disclosure, the initialization of the cathode of the light emitting element LD and compensation of the threshold voltage of the first transistor T1 may be performed by applying the same power voltage. For example, the compensation voltage line VCL and the second initialization voltage line VIL2 may be substantially provided as a single power voltage line. The initialization operation of the cathode and the compensation operation of the driving transistor may be performed using one power voltage, and thus design of the driving unit can be simplified. However, this is only an example, the disclosure is not limited to any one embodiment.

The first capacitor C1 may be disposed between the first node N1 and the third node N3. The first capacitor C1 may store a difference voltage between the first node N1 and the third node N3. The first capacitor C1 may be referred to as a storage capacitor.

The second capacitor C2 may be disposed between the third node N3 and the second power line VSL. For example, one electrode of the second capacitor C2 may be connected to the second power line VSL that receives the second power voltage VSS, and the other electrode of the second capacitor C2 may be connected to the third node N3. The second capacitor C2 may store charges corresponding to a voltage difference between the second power voltage VSS and the third node N3. The second capacitor C2 may be referred to as a hold capacitor. The second capacitor C2 may have a higher storage capacity than that of the first capacitor C1. Accordingly, the second capacitor C2 may minimize a change in the voltage of the third node N3 in response to a change in the voltage of the first node N1.

In an embodiment, the light emitting element LD may be connected to the pixel driving unit PDC through the fourth node N4. The light emitting element LD may include an anode connected to the first power line VDL and a cathode corresponding thereto. In an embodiment, the light emitting element LD may be connected to the pixel driving unit PDC through the cathode. For example, in the pixel PXij according to the disclosure, a connection node through which the light emitting element LD and the pixel driving unit PDC are connected may be the fourth node N4, and the fourth node N4 may correspond to a connection node between the first electrode of the sixth transistor T6 and the cathode of the light emitting element LD. Accordingly, a potential of the fourth node N4 may substantially correspond to a potential of the cathode of the light emitting element LD.

In detail, the anode of the light emitting element LD may be connected to the first power line VDL to receive the first power voltage VDD that is a constant voltage, and the cathode thereof may be connected to the first transistor T1 through the sixth transistor T6. For example, in an embodiment in which the first to eighth transistors T1 to T8 are N-type transistors, a potential of the third node N3 corresponding to the source of the first transistor T1 that is a driving transistor may not be directly affected by characteristics of the light emitting element LD. Thus, even in case that the light emitting element LD is degraded, effects on gate-source voltages Vgs of the transistors constituting the pixel driving unit PDC, particularly, driving transistors, may be reduced. For example, since the amount of change in a driving current due to the degradation of the light emitting element LD is reduced, afterimage defects of the display panel may be reduced as a usage time increases, and the lifetime thereof may be improved.

In other embodiments, as illustrated in FIG. 2B, the pixel PXij-1 may include a pixel driving unit PDC-1 including the two transistors T1 and T2 and the one capacitor C1. The pixel driving unit PDC-1 may be connected to the light emitting element LD, the writing scan line GWLi, the data line DLj, and the second power line VSL. The pixel driving unit PDC-1 illustrated in FIG. 2B may correspond to a component in which the third to eighth transistors T3 to T8 and the second capacitor C2 are omitted from the pixel driving unit PDC illustrated in FIG. 2A.

The first and second transistors T1 and T2 may be of an N-type or a P-type. In an embodiment, a case in which the first and second transistors T1 and T2 are N-type transistors will be described as an example.

The first transistor T1 may include a gate connected to the first node N1, a first electrode connected to the second node N2, and a second electrode connected to the third node N3. The second node N2 may be a node connected to the first power line VDL side, and the third node N3 may be a node connected to the second power line VSL side. The first transistor T1 is connected to the light emitting element LD through the second node N2 and connected to the second power line VSL through the third node N3. The first transistor T1 may be a driving transistor.

The second transistor T2 may include a gate that receives the writing scan signal GW through the writing scan line GWLi, a first electrode connected to the data line DLj, and a second electrode connected to the first node N1. The second transistor T2 may supply the data signal DATA to the first node N1 in response to the writing scan signal GW transmitted through the writing scan line GWLi.

The capacitor C1 may include an electrode connected to the first node N1 and an electrode connected to the third node N3. The capacitor C1 may store the data signal DATA transmitted to the first node N1.

The light emitting element LD may include the anode and the cathode. In an embodiment, the anode of the light emitting element LD is connected to the first power line VDL, and the cathode thereof is connected to the pixel driving unit PDC-1 through the second node N2. In an embodiment, the cathode of the light emitting element LD may be connected to the first transistor T1. The light emitting element LD may emit a light beam in response to the amount of a current flowing through the first transistor T1 of the pixel driving unit PDC-1.

In an embodiment in which the first and second transistors T1 and T2 are N-type transistors, the second node N2 through which the cathode of the light emitting element LD and the pixel driving unit PDC-1 are connected to each other may correspond to a drain of the first transistor T1. For example, a change in the gate-source voltage Vgs of the first transistor T1 caused by the light emitting element LD may be prevented. Accordingly, since the amount of change in a driving current due to the degradation of the light emitting element LD is reduced, afterimage defects of the display panel may be reduced as a usage time increases, and the lifetime thereof may be improved.

FIGS. 2A and 2B illustrate circuits for the pixel driving units PDC and PDC-1 according to an embodiment of the disclosure. In case that the display panel according to an embodiment of the disclosure is a circuit connected to the cathode of the light emitting element LD, the number or arrangement of the transistors and the number or arrangement of the capacitors may be variously designed, and are not limited to an embodiment.

Figure 3A:
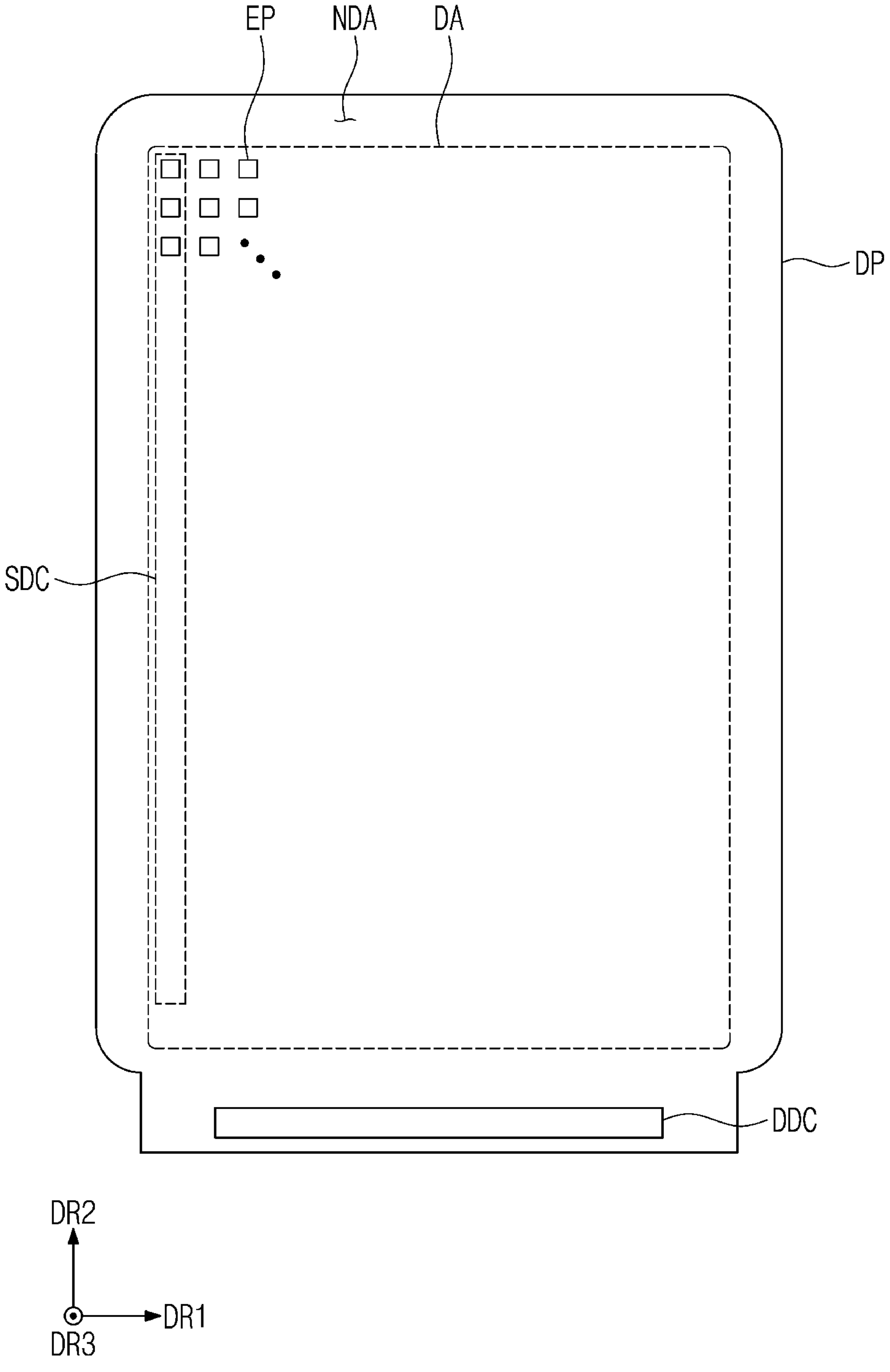
FIGS. 3A and 3B are schematic plan views illustrating a display panel according to an embodiment of the disclosure.
Figure 3B:
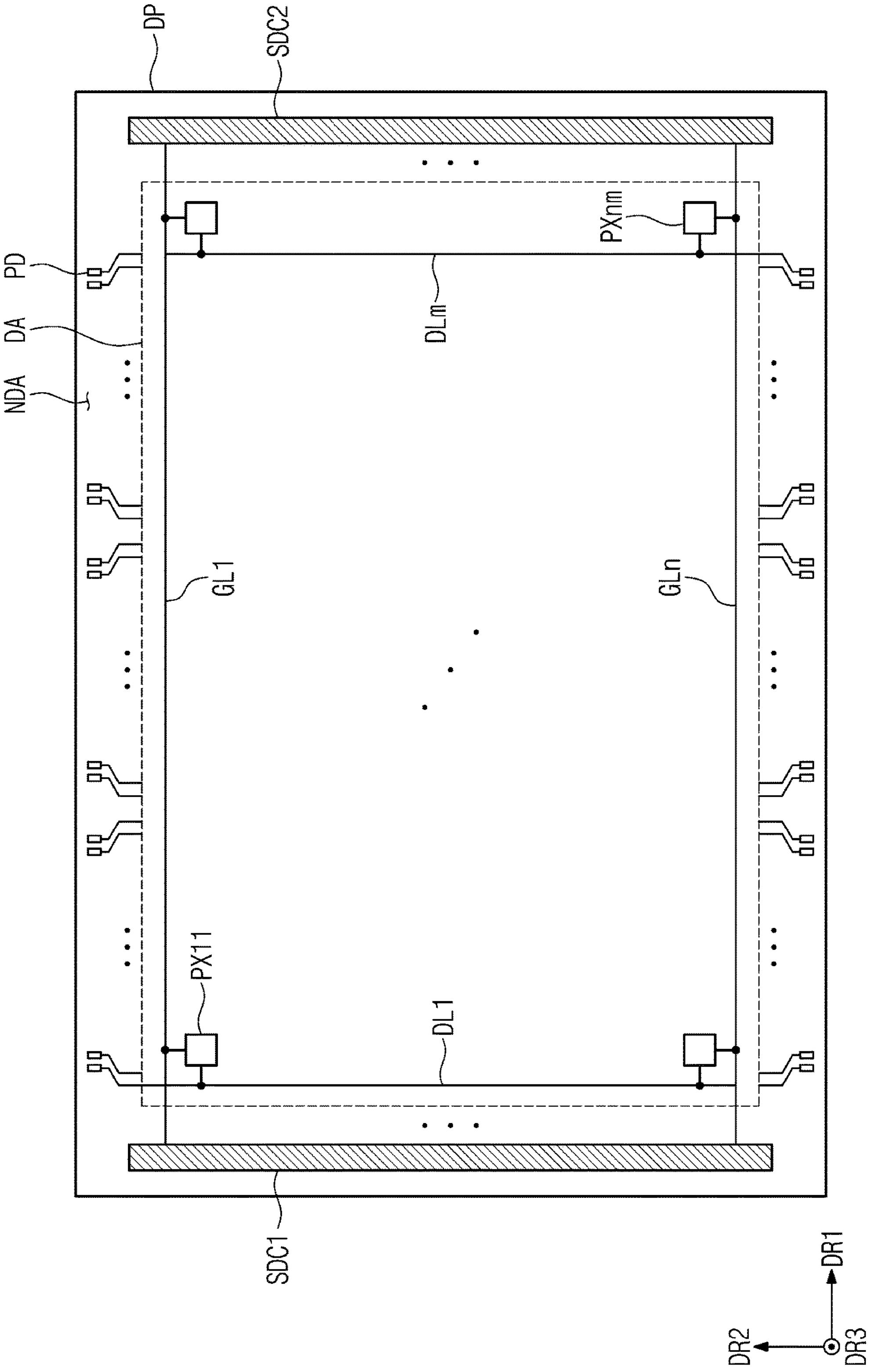

FIGS. 3A and 3B are schematic plan views illustrating a display panel according to an embodiment of the disclosure. In FIGS. 3A and 3B, some components are omitted. Hereinafter, the disclosure will be described with reference to FIGS. 3A and 3B. Referring to FIG. 3A, the display panel DP according to an embodiment may be divided into a display area DA and a peripheral area (or a non-display area NDA). The display area DA may include light emitting units EP.

The light emitting units EP may be areas emitting light beams by the pixels PXij (see FIG. 1). In detail, each of the light emitting units EP may correspond to a light emitting opening OP-PDL, which will be described below.

The peripheral area NDA may be disposed adjacent to the display area DA. In an embodiment, it is illustrated that the peripheral area NDA has a shape surrounding an edge of the display area DA. However, this is only an example, but the peripheral area NDA may be disposed on a side of the display area DA or may be omitted, and the disclosure is not limited to an embodiment.

In an embodiment, the scan driving unit SDC and the data driving unit DDC may be mounted on the display panel DP. In an embodiment, the scan driving unit SDC may be disposed in the display area DA, and the data driving unit DDC may be disposed in the peripheral area NDA. The scan driving unit SDC may overlap at least some of the light emitting units EP arranged in the display area DA in plan view. As the scan driving unit SDC is disposed in the display area DA, an area of the peripheral area NDA may be reduced as compared to a display panel according to the related art in which a scan driving unit is disposed in a peripheral area, and the display device having a thin bezel may be easily implemented.

Unlike the illustration of FIG. 3A, the scan driving unit SDC may be provided as two distinct parts. The two scan driving units SDC may be spaced apart from each other in a left-right direction with a center of the display area DA interposed therebetween. In other embodiments, the scan driving units SDC may be provided as a two or more scan driving units SDC, and the disclosure is not limited to an embodiment.

FIG. 3A illustrates an example of the display panel, and the data driving unit DDC may be disposed in the display area DA. Some of the light emitting units EP arranged in the display area DA may overlap the data driving unit DDC in plan view.

In an embodiment, the data driving unit DDC may be provided in the form of a separate driving chip independent of the display panel DP and connected to the display panel DP. However, this is illustratively described, and the data driving unit DDC may be formed in the same process as that of the scan driving unit SDC to constitute the display panel DP, but the disclosure is not limited to an embodiment.

As illustrated in FIG. 3B, a length of the display panel DP in a first direction DR1 may be greater than a length of the display panel DP in a second direction DR2. In an embodiment, the display panel DP may include scan driving units SDC1 and SDC2. It is illustratively illustrated that the scan driving units SDC1 and SDC2 include the first scan driving unit SDC1 and the second scan driving unit SDC2 spaced apart from each other in the first direction DR1.

The first scan driving unit SDC1 may be connected to some of the scan lines GL1 to GLn, and the second scan driving unit SDC2 may be connected to the others of the scan lines GL1 to GLn. For example, the first scan driving unit SDC1 may be connected to odd-numbered scan lines among the scan lines GL1 to GLn, and the second scan driving unit SDC2 may be connected to even-numbered scan lines among the scan lines GL1 to GLn.

For easy description, FIG. 3B illustrates pads PD of the data lines DL1 to DLm. The pads PD may be defined at ends of the data lines DL1 to DLm. The data lines DL1 to DLm may be connected to the data driving unit DDC (see FIG. 3A) through the pads PD.

According to the disclosure, the pads PD may be dividedly arranged at positions of the peripheral area NDA spaced apart from each other with the display area DA interposed therebetween. For example, some of the pads PD may be arranged on an upper side, that is, on a side adjacent to the first scan line GL1 among the scan lines GL1 to GLn, and the others of the pads PD may be arranged on a lower side, that is, the last scan line GLn among the scan lines GL1 to GLn. In an embodiment, the pads PD connected to odd-numbered data lines among the data lines DL1 to DLm may be arranged on an upper side, and the pads PD connected to even-numbered data lines among the data lines DL1 to DLm may be arranged on a lower side.

Although not illustrated, the display panel DP may include upper data driving units connected to the pads PD arranged on the upper side and/or lower data driving units connected to the pads PD arranged on the lower side. However, this is only an example, and the display panel DP may include one upper data driving unit connected to the pads PD arranged on the upper side and/or one lower data driving unit connected to the pads PD arranged on the lower side. For example, the pads PD according to an embodiment of the disclosure may be disposed on only one side of the display panel DP and connected to a single data driving unit, but the disclosure is not limited to an embodiment.

Further, as illustrated in FIG. 3A, in the display panel DP in FIG. 3B, the scan driving unit and/or the data driving unit may be arranged in the display area DA. Accordingly, some of the light emitting units arranged in the display area DA may overlap the scan driving unit and/or the data driving unit in plan view.

Figure 4A:
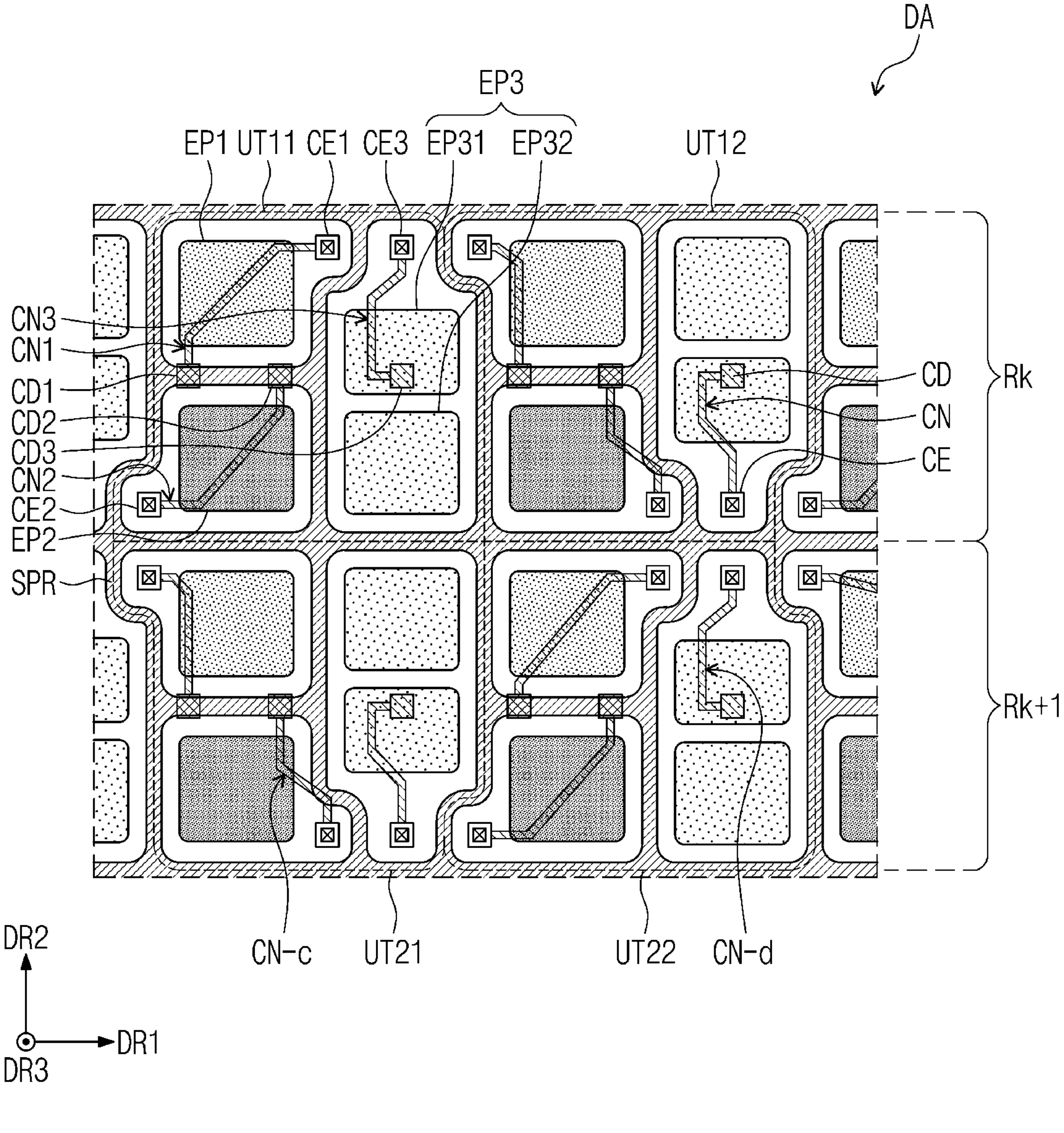
FIGS. 4A to 4C are enlarged schematic plan views of a partial area of the display panel according to an embodiment.
Figure 4B:
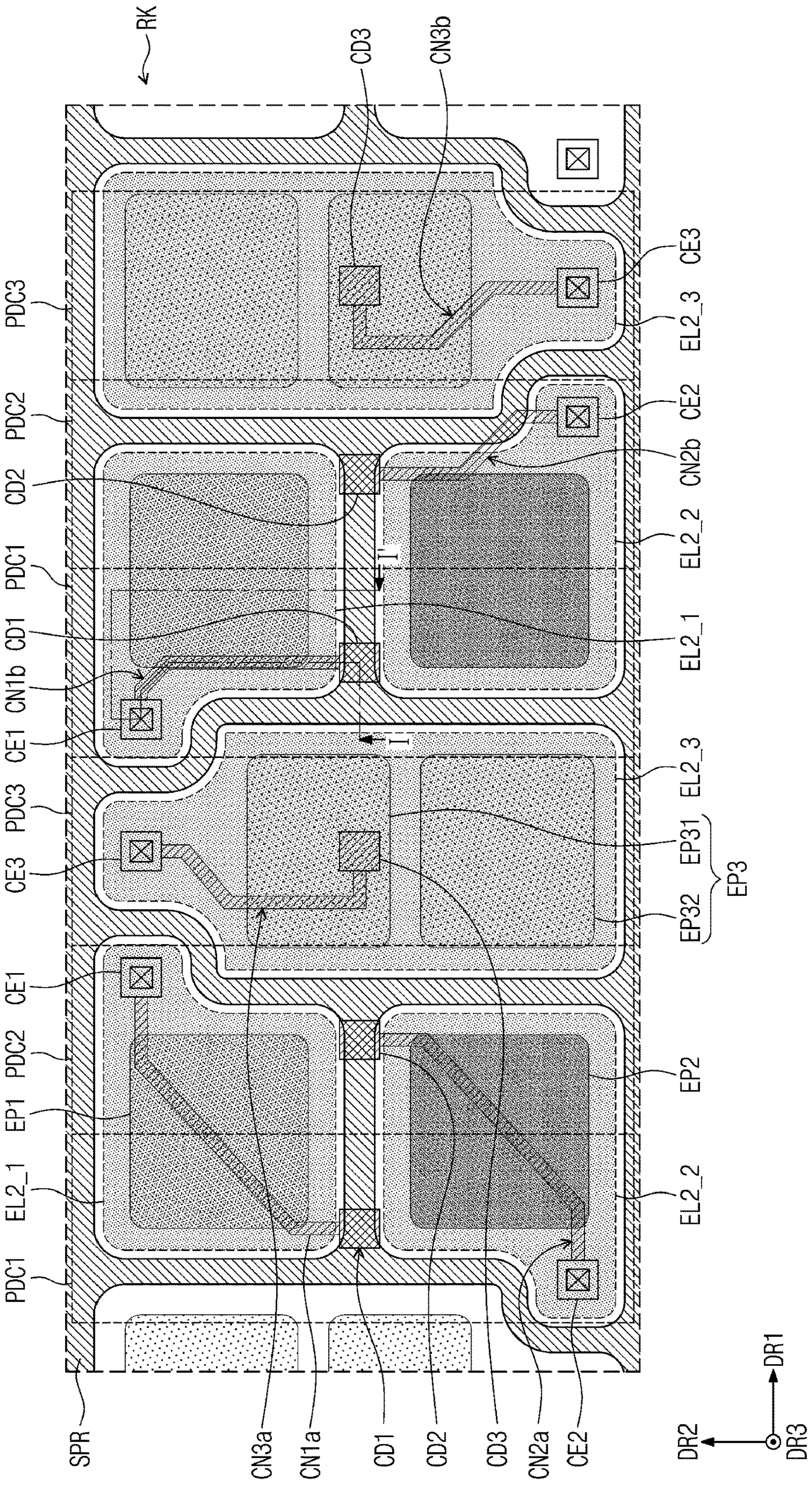
Figure 4C:
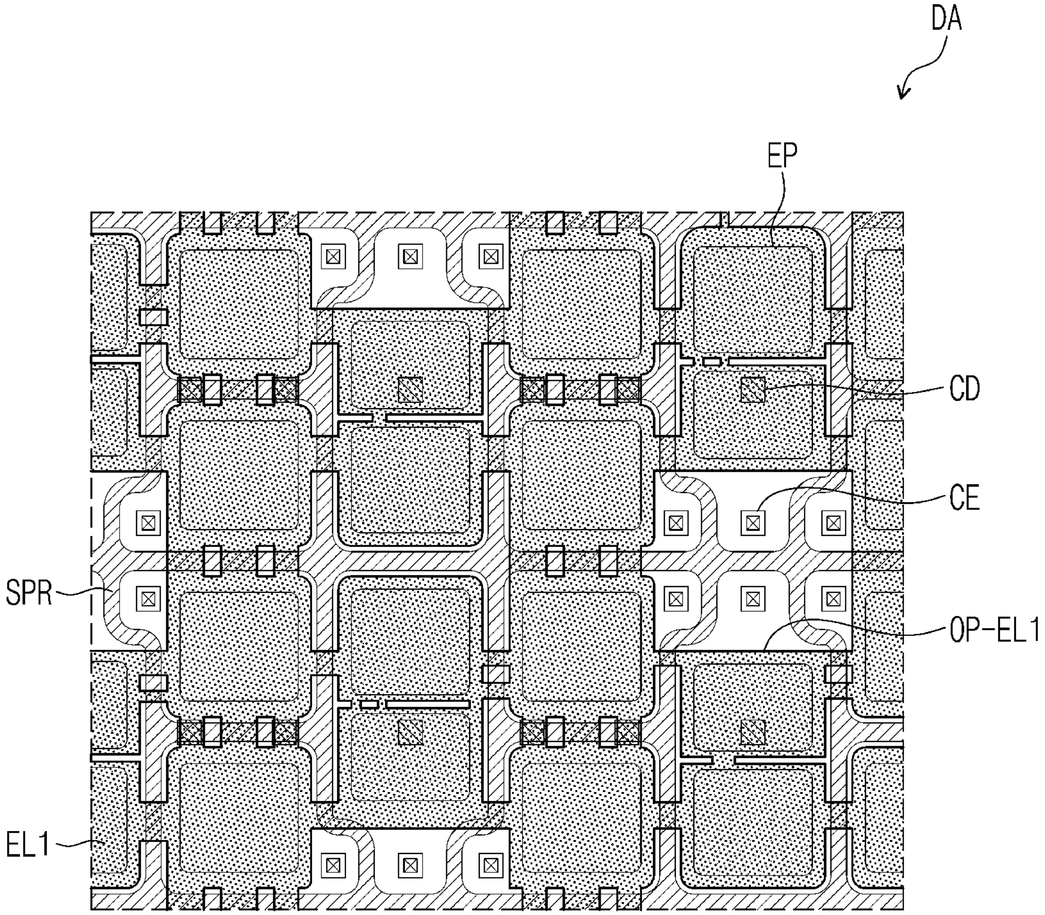

FIGS. 4A to 4C are enlarged schematic plan views of a partial area of the display panel according to an embodiment. FIG. 4A illustrates an area in which four light emitting units UT are arranged in two rows and two columns, and FIG. 4B is an enlarged view illustrating a partial area illustrated in FIG. 4A. In FIG. 4C, some components illustrated in FIG. 4A are omitted or emphasized. Hereinafter, the disclosure will be described with reference to FIGS. 4A to 4C.

FIG. 4A illustrates the light emitting units UT11, UT12, UT21, and UT22 in two rows and two columns. The light emitting units in a first row Rk include light emitting units constituting the first row first column light emitting unit UT11 and the first row second column light emitting unit UT12, and the light emitting units in a second row Rk+1 include light emitting units constituting the second row first column light emitting unit UT21 and the second row second column light emitting unit UT22. FIG. 4B illustrates the light emitting units in the first row Rk. FIGS. 4A to 4C illustrate a separator SPR, light emitting units EP1, EP2, and EP3 arranged in an area partitioned by the separator SPR, connection wiring lines CN1, CN2, and CN3, a first electrode EL1, and second electrodes EL2_1, EL2_2, and EL2_3 among components of the display panel.

As described above, the light emitting units EP1, EP2, and EP3 may correspond to the light emitting opening OP-PDL (see FIG. 5), which will be described below. For example, the light emitting units EP1, EP2, and EP3 may be areas in which light beams are emitted by the above-described light emitting elements and may correspond to a unit constituting an image displayed on the display panel DP. In more detail, the light emitting units EP1, EP2, and EP3 may correspond to an area defined by the light emitting opening OP-PDL, which will be described below, particularly, an area defined by a lower surface of the light emitting opening OP-PDL.

The light emitting units EP1, EP2, and EP3 may include the first light emitting unit EP1, the second light emitting unit EP2, and the third light emitting unit EP3. The first light emitting unit EP1, the second light emitting unit EP2, and the third light emitting unit EP3 may emit light beams having different colors from each other. For example, the first light emitting unit EP1 may emit a red light beam, the second light emitting unit EP2 may emit a green light beam, and the third light emitting unit EP3 may emit a blue light beam. However, a combination of the colors is not limited thereto. Further, at least two of the light emitting units EP1, EP2, and EP3 may emit light beams having the same color. For example, all the first to third light emitting units EP1, EP2, and EP3 may emit blue light beams or may emit white light beams.

Among the light emitting units EP1, EP2, and EP3, the third light emitting unit EP3 that displays a light beam emitted by a third light emitting element may include two sub-light emitting units EP31 and EP32 spaced apart from each other in the second direction DR2. However, this is only an example, and the third light emitting unit EP3 may be provided as one pattern having an integral shape like the other light emitting units EP1 and EP2, and at least one of the other light emitting units EP1 and EP2 may include sub-light emitting units spaced apart from each other. However, the disclosure is not limited to an embodiment.

The light emitting units in the first row Rk may include the light emitting units EP1, EP2, and EP3 constituting the first row first column light emitting unit UT11 and the first row second column light emitting unit UT12, and the light emitting units in the second row Rk+1 may include the light emitting units EP1, EP2, and EP3 constituting the second row first column light emitting unit UT21 and the second row second column light emitting unit UT22. Some of the light emitting units in the first row Rk and some of the light emitting units in the second row Rk+1 may have symmetrical shapes. For example, the first light emitting unit EP1 and the second light emitting unit EP2 of the second row first column light emitting unit UT21 and the first light emitting unit EP1 and the second light emitting unit EP2 of the first row first column light emitting unit UT11 may have shapes and arrangements in which the first light emitting units EP1 and the second light emitting units EP2 are line-symmetrical to each other with respect to an axis parallel to the second direction DR2. The third light emitting unit EP3 of the second row first column light emitting unit UT21 and the third light emitting unit EP3 of the first row first column light emitting unit UT11 may have shapes and arrangements that are line-symmetrical to an axis parallel to the first direction DR1. However, this is only an example, and the disclosure is not limited thereto.

Hereinafter, the first row first column light emitting unit UT11 will be described. For easy description, FIG. 4B illustrates the second electrodes EL2_1, EL2_2, and EL2_3, the pixel driving units PDC, and the connection wiring lines CN. The second electrodes EL2_1, EL2_2, and EL2_3 may be separated from each other and electrically disconnected from each other by the separator SPR. In an embodiment, one light emitting unit UT may include the three light emitting units EP1, EP2, and EP3. Accordingly, the light emitting unit UT may include the three second electrodes EL2_1, EL2_2, and EL2_3 (hereinafter, referred to as first to third cathodes), three pixel driving units PDC1, PDC2, and PDC3, and the three connection wiring lines CN1, CN2, and CN3. However, this is only an example, the number and arrangement of the light emitting units UT may be variously designed, and the disclosure is not limited to an embodiment.

The first to third pixel driving units PDC1, PDC2, and PDC3 may be electrically connected to the light emitting elements constituting the first to third light emitting units EP1, EP2, and EP3, respectively. In the specification, the wording "connected" includes not only a case of being physically connected by direct contact but also a case of being electrically connected.

Further, as illustrated in FIG. 4B, areas in which the pixel driving units PDC1, PDC2, and PDC3 are defined correspond to units in which transistors and capacitor elements constituting the circuit PDC (see FIG. 2) for driving the light emitting element of the pixel may be repeatedly arranged.

The first to third pixel driving units PDC1, PDC2, and PDC3 may be sequentially arranged in the first direction DR1. The arrangement positions of the first to third pixel driving units PDC1, PDC2, and PDC3 may be independently designed regardless of positions or shapes of the first to third light emitting units EP1, EP2, and EP3.

For example, the first to third pixel driving units PDC1, PDC2, and PDC3 may be areas partitioned and defined by the separator, that is, may be arranged in positions different from positions in which the first to third cathodes EL2_1, EL2_2, and EL2_3 are arranged or may be designed to have areas having shapes different from shapes of the first to third cathodes EL2_1, EL2_2, and EL2_3. In other embodiments, the first to third pixel driving units PDC1, PDC2, and PDC3 may be areas that are arranged to overlap positions in which the first to third light emitting units EP1, EP2, and EP3 are present and are partitioned and defined by the separator, for example, may be designed to have shapes and areas similar to those of the first to third cathodes EL2_1, EL2_2, and EL2_3.

In an embodiment, the first to third pixel driving units PDC1, PDC2, and PDC3 are illustrated in a rectangular shape, the first to third light emitting units EP1, EP2, and EP3 may be arranged in a smaller area than and a different shape from the first to third pixel driving units PDC1, PDC2, and PDC3, and the first to third cathodes EL2_1, EL2_2, and EL2_3 may be arranged at positions overlapping the first to third light emitting units EP1, EP2, and EP3 and illustrated in irregular shapes.

Accordingly, as illustrated in FIG. 4B, the first pixel driving unit PDC1 may be disposed at a position partially overlapping the first light emitting unit EP1, the second light emitting unit EP2, and another adjacent light emitting unit (s). The second pixel driving unit PDC2 may be disposed at a position overlapping the first light emitting unit EP1, the second light emitting unit EP2, and the third light emitting unit EP3. The third pixel driving unit PDC3 may be disposed at a position overlapping the third light emitting unit EP3. The positions of the first to third pixel driving units PDC1, PDC2, and PDC3 may be designed in various shapes and arrangements independently of the light emitting units EP1, EP2, and EP3, and the disclosure is not limited to an embodiment.

The connection wiring lines CN may be provided as multiple connection wiring lines CN, which may be spaced apart from each other. The connection wiring line CN may be electrically connected to the pixel driving unit and the light emitting element. In detail, the connection wiring line CN may correspond to the node (see N4 in FIG. 2A or N2 in FIG. 2B) through which the light emitting element LD is connected to the pixel driving unit PDC.

The connection wiring line CN may include a first connection part (or a light emitting connection part CE) and a second connection part (or a driving connection part CD). The light emitting connection part CE may be provided on one side of the connection wiring line CN, and the driving connection part CD may be provided on the other side of the connection wiring line CN.

The driving connection part CD may be a part of the connection wiring line CN, which is connected to the pixel driving unit PDC. In an embodiment, the driving connection part CD may be connected to one electrode of the transistor constituting the pixel driving unit PDC. In detail, the driving connection part CD may be connected to the drain of the sixth transistor T6 illustrated in FIG. 2A or the drain of the first transistor T1 illustrated in FIG. 2B. Accordingly, the position of the driving connection part CD may correspond to the transistor (see TR in FIG. 5) of the pixel driving unit, which is physically connected to the connection wiring line CN.

The light emitting connection part CE may be a part of the connection wiring line CN, which is connected to the light emitting element. In an embodiment, the light emitting connection part CE may be connected to a second electrode EL2 (hereinafter, referred to as the cathode) of the light emitting element. The light emitting connection part CE may be spaced apart from the light emitting opening OP-PDL (see FIG. 5) defined by the light emitting element LD (see FIG. 5). The light emitting connection part CE may include side surfaces. At least one side surface of the side surfaces may be connected to the cathode EL2 (see FIG. 5).

The light emitting unit UT may include the first to third connection wiring lines CN1, CN2, and CN3. The first connection wiring line CN1 may connect the light emitting element forming the first light emitting unit EP1 and the first pixel driving unit PDC1, the second connection wiring line CN2 may connect the light emitting element forming the second light emitting unit EP2 and the second pixel driving unit PDC2, and the third connection wiring line CN3 may connect the light emitting element forming the third light emitting unit EP3 and the third pixel driving unit PDC3.

In detail, the first to third connection wiring lines CN1, CN2, and CN3 may connect the first to third cathodes EL2_1, EL2_2, and EL2_3 and the first to third pixel driving units PDC1, PDC2, and PDC3, respectively. The first connection wiring line CN1 may include a first driving connection part CD1 connected to the first pixel driving unit PDC1 and a first light emitting connection part CE1 connected to the first cathode EL2_1. The second connection wiring line CN2 may include a second driving connection part CD2 connected to the second pixel driving unit PDC2 and a second light emitting connection part CE2 connected to the second cathode EL2_2. The third connection wiring line CN3 may include a third driving connection part CD3 connected to the third pixel driving unit PDC3 and a third light emitting connection part CE3 connected to the third cathode EL2_3.

The first to third driving connection parts CD1, CD2, and CD3 may be aligned in the first direction DR1. As described above, the first to third driving connection parts CD1, CD2, and CD3 may correspond to positions of connection transistors constituting the first to third pixel driving units PDC1, PDC2, and PDC3. The connection transistor may be a transistor including, as one electrode, the connection node through which the pixel driving unit and the light emitting element are connected in one pixel, and for example, may correspond to the sixth transistor T6 of FIG. 2A or the first transistor T1 of FIG. 2B. According to the disclosure, regardless of the shape or size of the light emitting unit and the color of the light beam, the shape, the position, and the arrangement of the pixel driving unit of all the pixels may be simply configured and designed.

In an embodiment, the first to third light emitting connection parts CE1, CE2, and CE3 may be arranged at positions that do not overlap the light emitting units EP1, EP2, and EP3 in plan view. As will be described below, the light emitting connection part CE (see FIG. 5) of the connection wiring line CN may be a part to which the light emitting element LD (see FIG. 5) is connected, may be a part in which a tip portion TP (see FIG. 5) is defined, and thus may be provided at a position that does not overlap the light emitting opening OP-PDL. For example, the light emitting connection parts CE1, CE2, and CE3 may be arranged at positions spaced apart from the light emitting units EP1, EP2, and EP3 in the cathodes EL2_1, EL2_2, and EL2_3, and the cathodes EL2_1, EL2_2, and EL2_3 may include partial areas protruding from the light emitting units EP1, EP2, and EP3 so that the cathodes EL2_1, EL2_2, and EL2_3 are connected to the connection wiring lines CN1, CN2, and CN3 in positions in which the light emitting connection parts CE1, CE2, and CE3 are arranged.

For example, the first cathode EL2_1 may include a protrusion part having a shape protruding from the first light emitting unit EP1 at a position that does not overlap the first light emitting unit EP1 so that the first cathode EL2_1 is connected to the first connection wiring line CN1 at a position in which the first light emitting connection part CE1 is disposed, and the light emitting connection part CE1 may be provided in the protrusion part.

Further, the first pixel driving unit PDC1, particularly, the first driving connection part CD1 at a position in which the first connection wiring line CN1 is connected to the transistor TR, may be defined at a position that does not overlap the first light emitting unit EP1 in plan view. According to an embodiment, the first connection wiring line CN1 may be disposed in the first light emitting unit EP1, and thus the first cathode EL2_1 and the first pixel driving unit PDC1 spaced apart from each other may be easily connected.

The third pixel driving unit PDC3, particularly, the third driving connection part CD3 at a position in which the third connection wiring line CN3 is connected to the transistor TR, may be defined at a position that does not overlap the third light emitting connection part CE3 in plan view and may be disposed at a position overlapping the third light emitting unit EP3. According to an embodiment, since the third cathode EL2_3 and the pixel driving unit PDC3 are connected through the third connection wiring line CN3, in designing the pixel driving unit PDC3, restrictions on the position or shape of the third light emitting part EP3 may be reduced, and thus the degree of freedom can be improved.

Referring back to FIG. 4A, the light emitting units in the second row Rk+1 may be light emitting units having a shape and arrangement in which the first row light emitting units UT11 and UT12 are line-symmetrical to an axis parallel to the first direction DR1 or the second direction DR2. Due to characteristics of the shape and arrangement of the first row light emitting units UT11 and UT12, the second row light emitting units UT21 and UT22 may be light emitting units in which the first row light emitting units UT11 and UT12 are substantially shifted in the first direction DR1 or the second direction DR2. For example, the second row first column light emitting unit UT21 may be light emitting units having the same shape as that of the first row second column light emitting unit UT12, and the second row second column light emitting unit UT22 may be light emitting units having the same shape as that of the first row first column light emitting unit UT11.

Accordingly, the shape and arrangement of connection wiring lines CN-c arranged in the second row first column light emitting unit UT21 may be the same as those of connection wiring lines CN1*b*, CN2*b*, and CN3*b* arranged in the first row second column light emitting units UT12. Likewise, the shape and arrangement of connection wiring lines CN-d arranged in the second row second column light emitting unit UT22 may be the same as those of connection wiring lines CN1*a*, CN2*a*, and CN3*a* arranged in the first row first column light emitting units UT11.

Referring to FIG. 4C, the first electrode EL1 (hereinafter, referred to as an anode) of the light emitting element according to an embodiment of the disclosure may be commonly provided in the light emitting units EP1, EP2, and EP3. For example, the anode EL1 may be formed as a single layer integral with the entire display area DA, and accordingly, a layer of the anode EL1 may be disposed to overlap the separator SPR. In other embodiments, the anodes EL1 of the light emitting elements may be formed as independent conductive patterns spaced apart from each other and may be electrically connected to each other through another conductive layer, and accordingly, the patterns in the anodes EL1 may be arranged so as not to overlap the separator SPR.

As described above, the first power voltage VDD may be applied to the anode EL1, and a common voltage may be applied to all the light emitting units. The anode EL1 may be connected to the first power line VDL (see FIG. 2A) that provides the first power voltage VDD in the peripheral area NDA or connected to the first power line VDL in the display area DA, but the disclosure is not limited to an embodiment.

Openings may be defined in the anode EL1 according to an embodiment, and the openings may pass through the layer of the anode EL1. The openings in the layer of the anode EL1 may be arranged at positions that do not overlap the light emitting units EP and may generally be defined at positions that overlap the separator SPR. The openings may facilitate discharge of gas generated from an organic layer disposed below the anode EL1, for example, generated from a sixth insulating layer 60 (see FIG. 5). Accordingly, in a process of manufacturing the display panel, the gas in the organic layer disposed below the light emitting element may be sufficiently discharged, and after the manufacturing, the gas discharged from the organic layer is reduced, and thus a degradation speed of the light emitting element may be reduced.

According to the disclosure, as the connection wiring line is included between the light emitting element and the pixel driving unit, even in case that only the shape of the cathode is changed without changing the arrangement or shape of the light emitting units, the light emitting element may be easily connected to the pixel driving unit. Accordingly, the degree of freedom for the arrangement of the pixel driving unit may be improved, and an area or resolution of the light emitting unit of the display panel may be easily increased.

Figure 5:
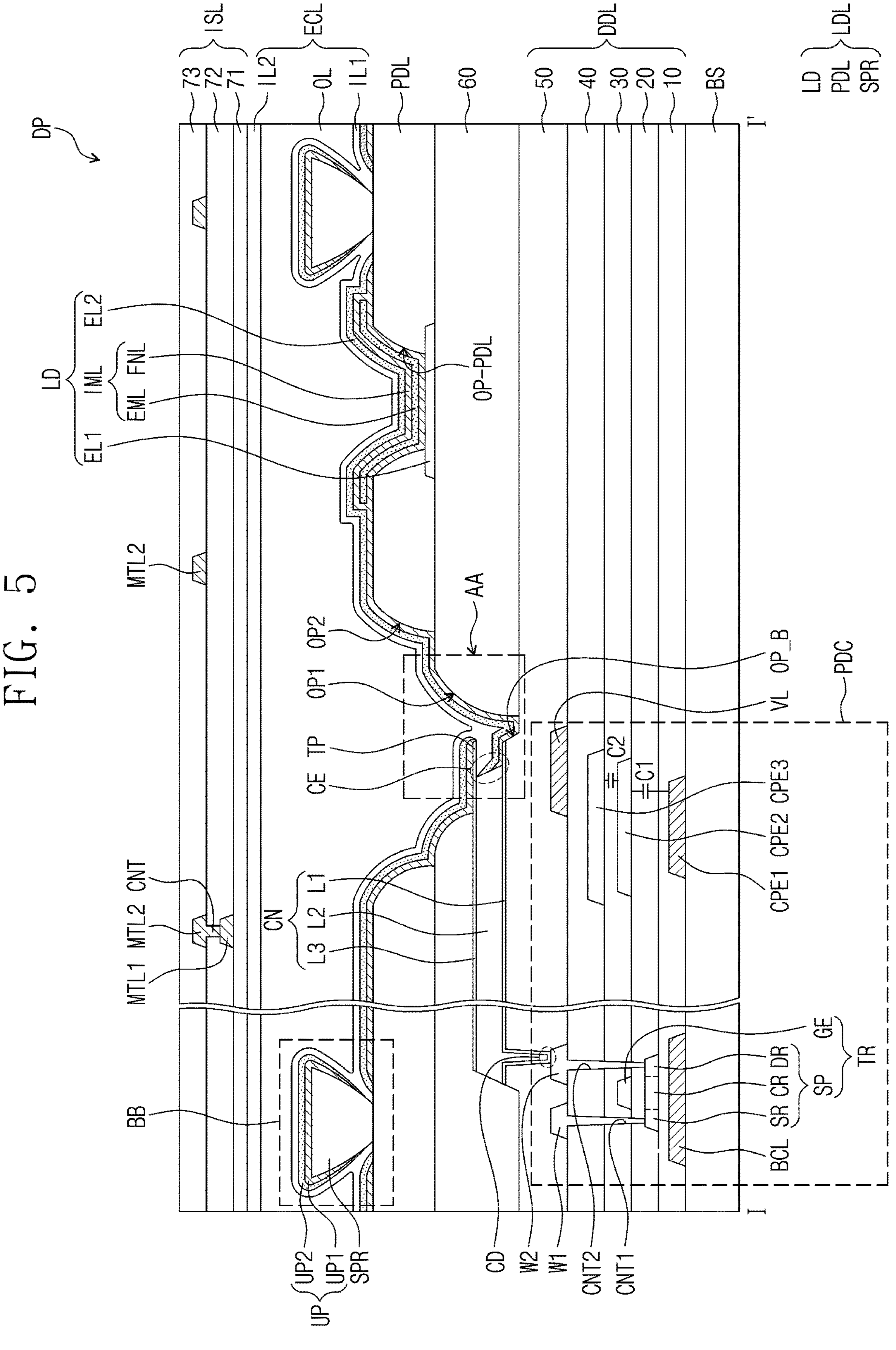
FIG. 5 is a schematic cross-sectional view of the display panel according to an embodiment of the disclosure.
Figure 6A:
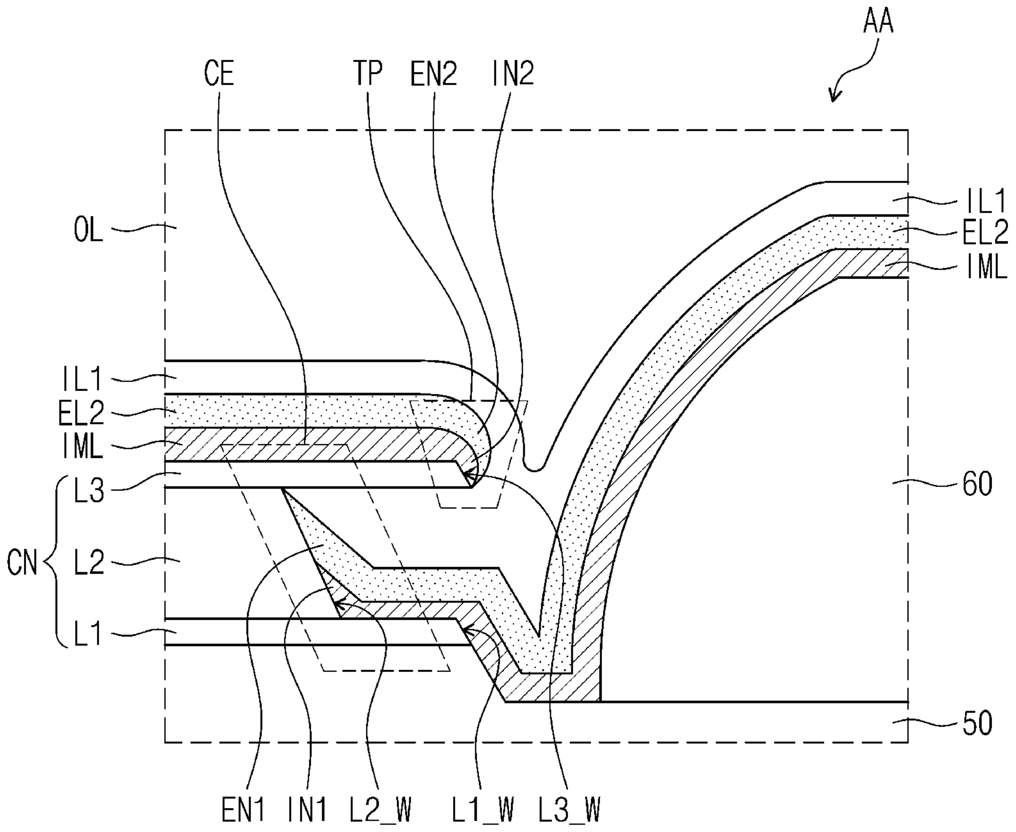
FIG. 6A is an enlarged schematic cross-sectional view of the partial area of the display panel according to an embodiment.
Figure 6B:
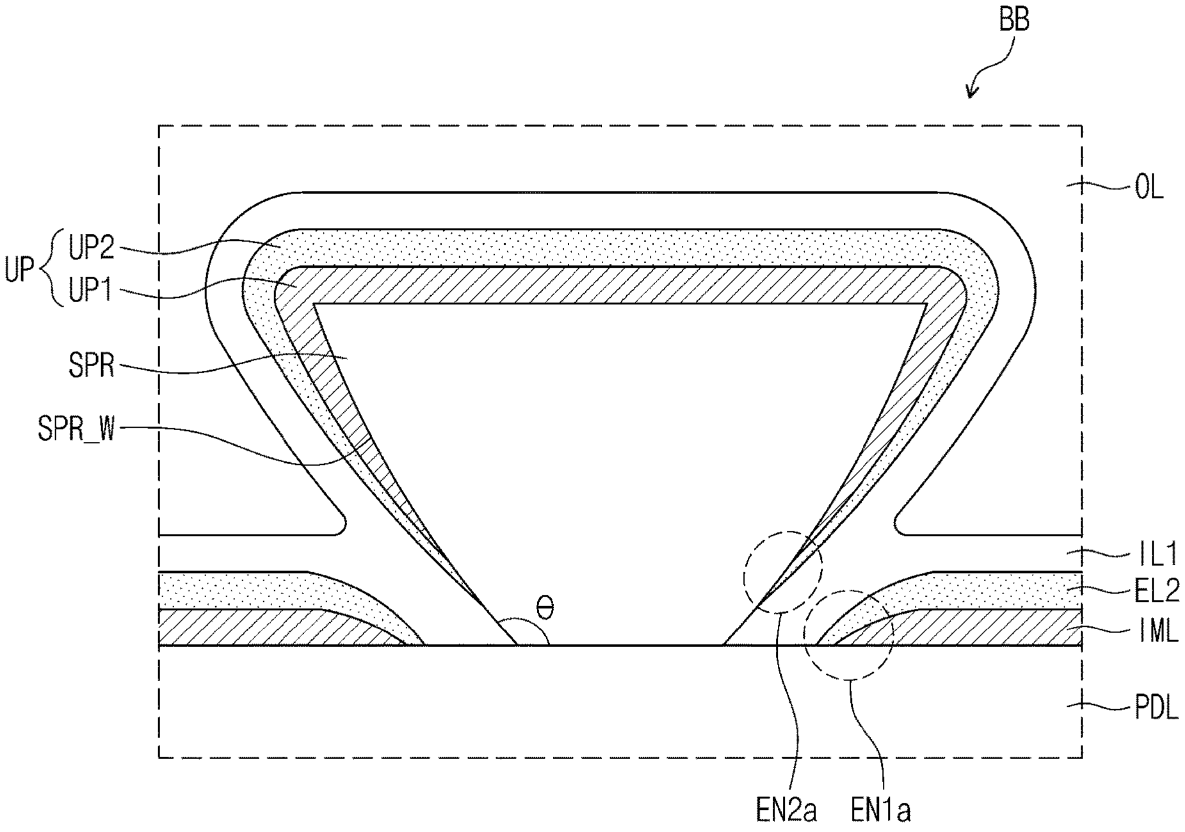
FIG. 6B is an enlarged schematic cross-sectional view of the partial area of the display panel according to an embodiment.

FIG. 5 is a schematic cross-sectional view of the display panel according to an embodiment of the disclosure. FIG. 6A is an enlarged schematic cross-sectional view of the partial area of the display panel according to an embodiment. FIG. 6B is an enlarged schematic cross-sectional view of the partial area of the display panel according to an embodiment. FIG. 5 is a cross-sectional view illustrating a part corresponding to line I-I' of FIG. 4B. FIG. 6A is an enlarged cross-sectional view of part AA of FIG. 5, and FIG. 6B is an enlarged cross-sectional view of part BB of FIG. 5. Hereinafter, the disclosure will be described with reference to FIGS. 5 to 6B.

Referring to FIG. 5, the display panel DP according to an embodiment may include a base layer BS, a driving element layer DDL, the sixth insulating layer 60 (or an upper insulating layer), a light emitting element layer LDL, an encapsulation layer ECL, and a detection layer ISL. The driving element layer DDL may include insulating layers 10, 20, 30, 40, and 50 arranged on the base layer BS and conductive patterns and semiconductor patterns arranged between the insulating layers. The conductive patterns and the semiconductor patterns may be arranged between the insulating layers to constitute the pixel driving unit PDC. For easy description, FIG. 5 illustrates a cross section of one of areas in which one light emitting unit is disposed.

The base layer BS may be a member providing a base surface on which the pixel driving unit PDC is disposed. The base layer BS may be a rigid substrate or a flexible substrate that may be bent, folded, and/or rolled. The base layer BS may be a glass substrate, a metal substrate, a polymer substrate, and/or the like. However, an embodiment of the disclosure is not limited thereto, and the base layer BS may also be an inorganic layer, an organic layer, or a composite material layer.

The base layer BS may have a multi-layered structure. The base layer BS may include a first polymer resin layer, a silicon oxide SiOx layer disposed on the first polymer resin layer, an amorphous silicon (a-Si) layer disposed on the silicon oxide layer, and a second polymer resin layer disposed on the amorphous silicon layer. The silicon oxide layer and the amorphous silicon layer may be referred to as a base barrier layer.

The polymer resin layer may include a polyimide-based resin. Further, the polymer resin layer may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin. In the specification, a "~~ based" resin means a resin containing a functional group of "~~".

The insulating layers, the conductive layers, and the semiconductor layers arranged on the base layer BS may be formed by manners such as coating and deposition. Thereafter, through photolithography processes, the insulating layer, the semiconductor layer, and the conductive layer may be selectively patterned so that a hole may be formed in the insulating layer or the semiconductor pattern, the conductive pattern, the signal line, and the like may be formed.

The driving element layer DDL may include the first to fifth insulating layers 10, 20, 30, 40, and 50 and the pixel driving unit PDC sequentially stacked on the base layer BS. FIG. 5 illustrates the one transistor TR and the two capacitors C1 and C2 of the pixel driving unit PDC. The transistor TR may correspond to a transistor connected to the light emitting element LD through the connection wiring line CN, that is, a connection transistor connected to the node (the fourth node N4 in FIG. 2A or the second node N2 in FIG. 2B) corresponding to the cathode of the light emitting element LD. In detail, the transistor TR may correspond to the sixth transistor T6 in FIG. 2A or the first transistor T1 in FIG. 2B. Although not illustrated, the other transistors constituting the pixel driving unit PDC may have the same structure as that of the transistor TR (hereinafter, referred to as a connection transistor) illustrated in FIG. 5. However, this is only an example, the other transistors constituting the pixel driving unit PDC may have a structure different from the connection transistor TR, and the disclosure is not limited to an embodiment.

The first insulating layer 10 may be disposed on the base layer BS. The first insulating layer 10 may be an inorganic layer and/or an organic layer, and may have a single-layer structure or a multi-layer structure. The first insulating layer 10 may include at least one of an aluminum oxide, a titanium oxide, a silicon oxide, a silicon nitride, a silicon oxynitride, a zirconium oxide, and a hafnium oxide. In an embodiment, the first insulating layer 10 is illustrated as a single silicon oxide layer. The insulating layers, which will be described below, may be an inorganic layer and/or an organic layer, and may have a single-layer structure or a multi-layer structure. The inorganic layer may include at least one of the above-described materials, but the disclosure is not limited thereto.

The first insulating layer 10 may cover a lower conductive layer BCL. For example, the display panel may further include the lower conductive layer BCL disposed to overlap the connection transistor TR. The lower conductive layer BCL may block an electric potential due to a polarization phenomenon of the base layer BS from affecting the connection transistor TR. Further, the lower conductive layer BCL may block a light beam input from a lower side to the connection transistor TR. At least one of an inorganic barrier layer and a buffer layer may be further disposed between the lower conductive layer BCL and the base layer BS.

The lower conductive layer BCL may include a reflective metal. For example, the lower conductive layer BCL may include titanium (Ti), molybdenum (Mo), an alloy containing molybdenum, aluminum (Al), an alloy containing aluminum, aluminum nitride (AlN), tungsten (W), tungsten nitride (WN), copper (Cu), and/or the like.

In an embodiment, the lower conductive layer BCL may be connected to a source of the transistor TR through a source electrode pattern W1. The lower conductive layer BCL may be synchronized with the source of the transistor TR. However, this is only an example, and the lower conductive layer BCL may be connected to a gate of the transistor TR and synchronized with the gate. In other embodiments, the lower conductive layer BCL may be connected to another electrode to independently receive a constant voltage or pulse signal. In other embodiments, the lower conductive layer BCL may be provided in the form isolated from other conductive patterns. The lower conductive layer BCL according to an embodiment of the disclosure may be provided in various forms and is not limited to an embodiment.

The connection transistor TR may be disposed on the base layer BS. For example, the connection transistor TR may be disposed on the first insulating layer 10. The connection transistor TR may include a semiconductor pattern SP and a gate electrode GE. The semiconductor pattern SP may be disposed on the first insulating layer 10. The semiconductor pattern SP may include an oxide semiconductor. For example, the oxide semiconductor may include a transparent conductive oxide TCO such as indium tin oxide (ITO), indium zinc oxide (IZO), indium gallium zinc oxide (IGZO), zinc oxide (ZnO) and/or indium oxide ($In_2O_3$). However, the disclosure is not limited thereto, and the semiconductor pattern may include amorphous silicon, low-temperature polycrystalline silicon, or polycrystalline silicon.

The semiconductor pattern SP may include a source region SR, a drain region DR, and a channel region CR, which are distinguished according to the degree of conductivity. The channel region CR may be a portion overlapping the gate electrode GE in plan view. The source region SR and the drain region DR may be portions spaced apart from each other with the channel region CR interposed therebetween. In case that the semiconductor pattern SP is the oxide semiconductor, the source region SR and the drain region DR may be reduced regions. Accordingly, the source region SR and the drain region DR may have a relatively high reduction metal content compared to the channel region CR. In other embodiments, in case that the semiconductor pattern SP is the polycrystalline silicon, the source region SR and the drain region DR may be regions doped at a high concentration.

The source region SR and the drain region DR may have relatively higher conductivity than that of the channel region CR. The source region SR may correspond to a source electrode of the connection transistor TR, and the drain region DR may correspond to a drain electrode of the connection transistor TR. As illustrated in FIG. 5, the separate source electrode pattern W1 and a separate drain electrode pattern W2 connected to the source region SR and the drain region DR, respectively, may be further provided. In detail, the separate source electrode pattern W1 and the separate drain electrode pattern W2 may be formed integrally with one of the lines constituting the pixel driving unit (see FIGS. 2A and 2B), and the disclosure is not limited thereto.

The second insulating layer 20 may commonly overlap the pixels and cover the semiconductor pattern SP. The second insulating layer 20 may be an inorganic layer and/or an organic layer and may have a single-layer structure or a multi-layer structure. The second insulating layer 20 may include at least one of an aluminum oxide, a titanium oxide, a silicon oxide, a silicon nitride, a silicon oxynitride, a zirconium oxide, and a hafnium oxide. In an embodiment, the second insulating layer 20 may be a single silicon oxide layer.

The gate electrode GE may be disposed on the second insulating layer 20. The gate electrode GE may correspond to the gate of the connection transistor TR. Further, the gate electrode GE may also be disposed on the semiconductor pattern SP. However, this is only an example, the gate electrode GE may be disposed below the semiconductor pattern SP, and the disclosure is not limited to an embodiment.

The gate electrode GE may include titanium (Ti), silver (Ag), molybdenum (Mo), aluminum (Al), aluminum nitride (AlN), tungsten (W), tungsten nitride (WN), copper (Cu), and/or alloys thereof, but the disclosure is not particularly limited thereto.

The third insulating layer 30 may be disposed on the gate electrode GE. The third insulating layer 30 may be an inorganic layer and/or an organic layer and may have a single-layer structure or a multi-layer structure. The fourth insulating layer 40 may include at least one of an aluminum oxide, a titanium oxide, a silicon oxide, a silicon nitride, a silicon oxynitride, a zirconium oxide, and a hafnium oxide.

A first capacitor electrode CPE1 and a second capacitor electrode CPE2 among the conductive patterns W1, W2, CPE1, CPE2, and CPE3 constitute the first capacitor C1. The first capacitor electrode CPE1 and the second capacitor electrode CPE2 may be spaced apart from each other with the first insulating layer 10 and the second insulating layer 20 interposed therebetween.

In an embodiment, the first capacitor electrode CPE1 and the lower conductive layer BCL may also have an integral shape. Further, the second capacitor electrode CPE2 and the gate electrode GE may have an integral shape.

The third capacitor electrode CPE3 may be disposed on the third insulating layer 30. The third capacitor electrode CPE3 may be spaced apart from the second capacitor electrode CPE2 with the third insulating layer 30 interposed therebetween and overlap the second capacitor electrode CPE2 in plan view. The third capacitor electrode CPE3 and the second capacitor electrode CPE2 may constitute the second capacitor C2.

The fourth insulating layer 40 may be disposed on the third insulating layer 30 and/or the third capacitor electrode CPE3. The fourth insulating layer 40 may be an inorganic layer and/or an organic layer and may have a single-layer structure or a multi-layer structure. The fourth insulating layer 40 may include at least one of an aluminum oxide, a titanium oxide, a silicon oxide, a silicon nitride, a silicon oxynitride, a zirconium oxide, and a hafnium oxide.

The source electrode pattern W1 and the drain electrode pattern W2 may be arranged on the fourth insulating layer 40. The source electrode pattern W1 may be connected to the source region SR of the connection transistor TR through a first contact hole CNT1, and the source electrode pattern W1 and the source region SR of the semiconductor pattern SP may function as the source of the connection transistor TR. The drain electrode pattern W2 may be connected to the drain region DR of the connection transistor TR through a second contact hole CNT2, and the drain electrode pattern W2 and the drain region DR of the semiconductor pattern SP may function as a drain of the connection transistor TR. The fifth insulating layer 50 may be disposed on the source electrode pattern W1 and the drain electrode pattern W2.

Voltage lines VL may be arranged on the fourth insulating layer 40. The voltage lines VL may include the first power line VDL (see FIG. 2A), the second power line VSL (see FIG. 2A), the third power line (or the reference voltage line VRL; see FIG. 2A), the fourth power line (or the first initialization voltage line VIL1; see FIG. 2A), the fifth power line (or the second initialization voltage line VIL2; see FIG. 2A), the sixth power line (or the compensation voltage line VCL; see FIG. 2A), and the data line DLj (see FIG. 2A). The data line DLj may provide a data voltage. Some of the voltage lines VL may overlap the light emitting connection part CE in plan view. A detailed description thereof will be made below.

The connection wiring line CN may be disposed on the fifth insulating layer 50. The connection wiring line CN may electrically connect the pixel driving unit PDC and the light emitting element LD. For example, the connection wiring line CN may electrically connect the connection transistor TR and the light emitting element LD. The connection wiring line CN may be a connection node that connects the pixel driving unit PDC and the light emitting element LD. For example, the connection wiring line CN may correspond to the fourth node N4 (see FIG. 2A) illustrated in FIG. 2A or correspond to the second node N2 (see FIG. 2B) illustrated in FIG. 2B. This is illustratively described, the connection wiring line CN may be defined as a connection node with various elements among elements constituting the pixel driving unit PDC according to the design of the pixel driving unit PDC as long as the connection wiring line CN may be connected to the light emitting element LD, and the disclosure is not limited to an embodiment. For example, the connection wiring line CN may be disposed on the sixth insulating layer 60 or a pixel definition film PDL.

The fifth insulating layer 50 (or a lower insulating layer) may be disposed on the transistor TR. A lower opening OP_B may be defined in the fifth insulating layer 50. The lower opening OP_B may not overlap the connection wiring line CN in plan view. The lower opening OP_B may be a concavely recessed shape with respect to a first layer L1 of the connection wiring line CN.

The sixth insulating layer 60 may be disposed on the connection wiring line CN. The sixth insulating layer 60 may be disposed on the fifth insulating layer 50 to cover the connection wiring line CN. The fifth insulating layer 50 and the sixth insulating layer 60 may be organic layers. For example, each of the fifth insulating layer (or the lower insulating layer) and the sixth insulating layer 60 (or the upper insulating layer) may include general purpose polymers such as benzocyclobutene (BCB), polyimide, hexamethyldisiloxane (HMDSO), polymethylmethacrylate (PMMA), and/or polystyrene (PS), a polymer derivative having a phenolic group, an acryl-based polymer, an imide-based polymer, an arylether-based polymer, an amide-based polymer, a fluorine-based polymer, a p-xylene-based polymer, a vinyl alcohol-based polymer, and/or blends thereof.

The sixth insulating layer 60 may be provided with an opening (hereinafter, a first opening OP1) through which at least a portion of the connection wiring line CN is exposed. For example, the first opening OP1 may overlap at least one side surface among multiple side surfaces of the light emitting connection part CE. The connection wiring line CN may be electrically connected to the light emitting element LD through the portion thereof exposed from the sixth insulating layer 60. For example, the connection wiring line CN may electrically connect the connection transistor TR and the light emitting element LD. A detailed description thereof will be described below. In the display panel DP according to an embodiment of the disclosure, the sixth insulating layer 60 may be omitted or may be provided as multiple sixth insulating layers 60, but the disclosure is not limited to an embodiment.

The light emitting element layer LDL may be disposed on the sixth insulating layer 60. The light emitting element layer LDL may include the pixel definition film PDL, the light emitting element LD, and the separator SPR. The pixel definition film PDL may be an organic layer. For example, the pixel definition film PDL may include general purpose polymers such as benzocyclobutene (BCB), polyimide, hexamethyldisiloxane (HMDSO), polymethylmethacrylate (PMMA), and/or polystyrene (PS), a polymer derivative having a phenolic group, an acryl-based polymer, an imide-based polymer, an arylether-based polymer, an amide-based polymer, a fluorine-based polymer, a p-xylene-based polymer, a vinyl alcohol-based polymer, and/or blends thereof.

In an embodiment, the pixel definition film PDL may have a property of absorbing a light beam and may have, for example, a black color. For example, the pixel definition film PDL may include a black coloring agent. The black coloring agent may include black dye and black pigment. The black coloring agent may include carbon black, metal such as chromium, or an oxide thereof. The pixel definition film PDL may correspond to a light blocking pattern having light blocking characteristics.

The opening OP-PDL (hereinafter, referred to as a light emitting opening), through which at least a portion of the first electrode EL1 which will be described below is exposed, may be defined in the pixel definition film PDL. For example, the light emitting opening OP-PDL may overlap a portion of the first electrode EL1. The light emitting openings OP-PDL may be provided as multiple light emitting openings OP-PDL which may be arranged to correspond to the light emitting elements, respectively. All components of the light emitting element LD may be arranged to overlap the light emitting opening OP-PDL, and the light emitting opening OP-PDL may be an area (hereinafter, a light emitting area) on which a light beam emitted by the light emitting element LD is substantially displayed. Accordingly, the shape of the light emitting unit EP (see FIG. 3) may substantially correspond to a shape of the light emitting opening OP-PDL or the light emitting area in plan view. Further, a second opening OP2 overlapping the first opening OP1 may be defined in the pixel definition film PDL.

The light emitting element LD may include the first electrode EL1, an intermediate layer IML, and the second electrode EL2. The first electrode EL1 may be a semi-transmissive, transmissive, or reflective electrode. According to an embodiment of the disclosure, the first electrode EL1 may include a reflective layer formed of silver (Ag), magnesium (Mg), aluminum (Al), platinum (Pt), palladium (Pd), gold (Au), nickel (Ni), neodymium (Nd), iridium (Ir), chromium (Cr), and/or compounds thereof and a transparent or translucent electrode layer formed on the reflective layer. The transparent or translucent electrode layer may include at least one selected from the group consisting of indium tin oxide (ITO), indium zinc oxide (IZO), indium gallium zinc oxide (IGZO), zinc oxide (ZnO) or indium oxide (In2O3), and aluminum doped zinc oxide (AZO). For example, the first electrode EL1 may include a stacked structure of ITO/Ag/ITO.

In an embodiment, the first electrode EL1 may be the anode of the light emitting element LD. For example, the first electrode EL1 may be connected to the first power line VDL (see FIG. 2A), and the first power voltage VDD (see FIG. 2A) may be applied to the first electrode EL1. The first electrode EL1 may be connected to the first power line VDL inside the display area DA or connected to the first power line VDL in the peripheral area NDA. In the latter, the first power line VDL may be disposed in the peripheral area NDA, and the first electrode EL1 may have a shape extending up to the peripheral area NDA.

On the cross-sectional view of FIG. 5, it is illustrated that the first electrode EL1 overlaps the light emitting opening OP-PDL and does not overlap the separator SPR. However, as illustrated in FIG. 4C, the first electrodes EL1 of the light emitting elements may have an integral shape and may have a mesh or lattice shape in which openings are defined in a partial area. For example, in case that the same first power voltage VDD may be applied to the first electrode EL1 of each of the light emitting elements, the shape of the first electrode EL1 may be variously provided, and the disclosure is not limited to an embodiment.

The intermediate layer IML may be disposed between the first electrode EL1 and the second electrode EL2. The intermediate layer IML may include a light emitting layer EML and a functional layer FNL. The light emitting element LD may include the intermediate layer IML having various structures, and the disclosure is not limited to an embodiment. For example, the functional layer FNL may be provided as layers or as two or more layers spaced apart from each other with the light emitting layer EML interposed therebetween. In other embodiments, the functional layer FNL may be omitted.

The light emitting layer EML may include an organic light emitting material. Further, the light emitting layer EML may include an inorganic light emitting material or may be provided as a mixed layer of the organic light emitting material and the inorganic light emitting material. In an embodiment, the light emitting layer EML included in each of the adjacent light emitting units EP may include light emitting materials displaying different colors. For example, the light emitting layer EML included in each of the light emitting units EP may provide any one of the blue light beam, the red light beam, and the green light beam. However, the disclosure is not limited thereto, and all the light emitting layers EML disposed in the light emitting units EP may include a light emitting material displaying the same color. The light emitting layer EML may provide the blue light beam or the white light beam. Further, in FIG. 5, an embodiment in which the light emitting layer EML and the functional layer FNL have different shapes is illustrated. However, the disclosure is not limited thereto, and the light emitting layer EML and the functional layer FNL may be arranged in the same shape.

The functional layer FNL may be disposed between the first electrode EL1 and the second electrode EL2. In detail, the functional layer FNL may be disposed between the first electrode EL1 and the light emitting layer EML or disposed between the second electrode EL2 and the light emitting layer EML. In other embodiments, the functional layer FNL may be disposed both between the first electrode EL1 and the light emitting layer EML and between the second electrode EL2 and the light emitting layer EML. In an embodiment, it is illustrated that the light emitting layer EML is inserted into the functional layer FNL. However, this is only an example, the functional layer FNL may include a layer disposed between the light emitting layer EML and the first electrode EL1 and/or a layer disposed between the light emitting layer EML and the second electrode EL2 and may be provided as functional layers FNL, and the disclosure is not limited to an embodiment.

The functional layer FNL may control movement of charges between the first electrode EL1 and the second electrode EL2. The functional layer FNL may include a hole injection/transport material and/or an electron injection/transport material. The functional layer FNL may include at least one of an electron blocking layer, a hole transporting layer, a hole injecting layer, a hole blocking layer, an electron transporting layer, an electron injecting layer, and a charge generating layer.

The second electrode EL2 may be one of the second electrodes EL2_1, EL2_2, and EL2_3 illustrated in FIGS. 4A to 4C. For example, the second electrode EL2 may be the second electrode EL2_1 (see FIG. 4B). The second electrode EL2 may be disposed on the intermediate layer IML. As described above, the second electrode EL2 may be connected to the connection wiring line CN and electrically connected to the pixel driving unit PDC. For example, the second electrode EL2 may be electrically connected to the connection transistor TR through the connection wiring line CN.

As described above, the connection wiring line CN may include the driving connection part CD and the light emitting connection part CE. The driving connection part CD may be a part of the connection wiring line CN, which is connected to the pixel driving unit PDC and a part substantially connected to the connection transistor TR. In an embodiment, the driving connection part CD may be electrically connected to the drain region DR of the semiconductor pattern SP through the drain electrode pattern W2 while passing through the fifth insulating layer 50. The light emitting connection part CE may be a part of the connection wiring line CN, which is connected to the light emitting element LD. The light emitting connection part CE may be a part which is defined in an area exposed from the sixth insulating layer 60 and to which the second electrode EL2 is connected. The tip portion TP may be defined in the light emitting connection part CE.

The light emitting connection part CE of the connection wiring line CN will be described in more detail with reference to FIGS. 5 and 6A. As illustrated in FIGS. 5 and 6A, the connection wiring line CN may have a three-layered structure. In detail, the connection wiring line CN may include a first layer L1, a second layer L2, and a third layer L3 sequentially stacked in a third direction DR3. The second layer L2 may include a material that is different from that of the first layer L1. Further, the second layer L2 may include a material that is different from that of the third layer L3. The second layer L2 may have a relatively larger thickness than that of the first layer L1. Further, the second layer L2 may have a relatively larger thickness than that of the third layer L3. The second layer L2 may include a material having high conductivity. In an embodiment, the second layer L2 may include aluminum (Al).

The first layer L1 may include a material having a lower etching rate than that of the second layer L2. For example, the first layer L1 and the second layer L2 may be formed of materials having a high etching selectivity. In an embodiment, the first layer L1 may include titanium (Ti), and the second layer L2 may include aluminum (Al). A side surface L1_W of the first layer L1 may be defined outside a side surface L2_W of the second layer L2. For example, the light emitting connection part CE of the connection wiring line CN may have a shape in which the side surface L1_W of the first layer L1 protrudes outward from the side surface L2_W of the second layer L2. For example, the light emitting connection part CE of the connection wiring line CN may have a shape in which the side surface L2_W of the second layer L2 is recessed inward from the side surface L1_W of the first layer L1.

Further, the third layer L3 may include a material having a lower etching rate than that of the second layer L2. For example, the third layer L3 and the second layer L2 may be formed of materials having a high etching selectivity. In an embodiment, the third layer L3 may include titanium (Ti), and the second layer L2 may include aluminum (Al). A side surface L3_W of the third layer L3 may be defined outside the side surface L2_W of the second layer L2. For example, the light emitting connection part CE of the connection wiring line CN may have a shape in which the side surface L3_W of the third layer L3 protrudes outward from the side surface L2_W of the second layer L2. For example, the light emitting connection part CE of the connection wiring line CN may have an undercut shape or an overhang structure, and the third layer L3 may include the tip portion TP protruding from the side surface L2_W of the second layer L2.

The sixth insulating layer 60 and the pixel definition film PDL may expose at least a portion of the tip portion TP and at least a portion of the second side surface L2_W. In detail, the first opening OP1 through which one side of the connection wiring line CN is exposed may be defined in the sixth insulating layer 60, and the second opening OP2 overlapping the first opening OP1 may be defined in the pixel definition film PDL. A planar area of the second opening OP2 may be greater than that of the first opening OP1. However, the disclosure is not limited thereto, and the planar area of the second opening OP2 may be smaller than or equal to that of the first opening OP1 as long as the at least a portion of the tip portion TP and the at least a portion of the second side surface L2_W may be exposed.

The intermediate layer IML may be disposed on the pixel definition film PDL. The intermediate layer IML may also be disposed on a partial area of the sixth insulating layer 60, which is exposed by the second opening OP2 of the pixel definition film PDL. Further, the intermediate layer IML may also be disposed on a partial area of the connection wiring line CN, which is exposed by the first opening OP1 of the sixth insulating layer 60. As illustrated in FIG. 6A, the intermediate layer IML may include one end IN1 disposed along an upper surface of the fifth insulating layer 50 and the other end IN2 disposed along an upper surface of the tip portion TP. For example, when viewed on a cross section, the intermediate layer IML may have a shape that is partially disconnected with respect to the tip portion TP in an area in which the light emitting connection part CE is defined. However, in plan view, the intermediate layer IML may have an integral shape connected as a whole within an area (see FIG. 4) defined as a closed line by the separator SPR.

The second electrode EL2 may be disposed on the intermediate layer IML. The second electrode EL2 may also be disposed on the partial area of the sixth insulating layer 60, which is exposed by the second opening OP2 of the pixel definition film PDL. Further, the second electrode EL2 may also be disposed on the partial area of the connection wiring line CN, which is exposed by the first opening OP1 of the sixth insulating layer 60. As illustrated in FIG. 6A, the second electrode EL2 may include one end EN1 disposed along the upper surface of the fifth insulating layer 50 and the other end EN2 disposed along the upper surface of the tip portion TP. For example, when viewed on a cross section, the second electrode EL2 may have a shape that is partially disconnected with respect to the tip portion TP in the area in which the light emitting connection part CE is defined. However, in plan view, the second electrode EL2 may have an integral shape connected as a whole within an area (see FIG. 4) defined as a closed curved line by the separator SPR.

The one end EN1 of the second electrode EL2 may be disposed along a side surface of the second layer L2 and may be in contact with the side surface L2_W of the second layer L2. In detail, the second electrode EL2 may be formed to be in contact with the side surface L2_W of the second layer L2 exposed from the intermediate layer IML by the tip portion TP through a difference between deposition angles of the second electrode EL2 and the intermediate layer IML. For example, the second electrode EL2 may be connected to the connection wiring line CN without a separate patterning process for the intermediate layer IML, and accordingly, the light emitting element LD may be electrically connected to the pixel driving unit PDC through the connection wiring line CN.

Further, in an embodiment, it is illustrated that the other end IN2 of the intermediate layer IML and the other end EN2 of the second electrode EL2 cover the side surface L3_W of the third layer L3. This is illustratively illustrated, and at least a portion of the side surface L3_W of the third layer L3 may be exposed from the other end IN2 of the intermediate layer IML and/or the other end EN2 of the second electrode EL2.

As described above, the display panel DP may include the separator SPR. The separator SPR may be disposed on the pixel definition film PDL. In an embodiment, the second electrode EL2 and the intermediate layer IML may be formed by commonly depositing the pixels through an open mask. The second electrode EL2 and the intermediate layer IML may be divided by the separator SPR. As described above, the separator SPR may have a closed line shape for each light emitting unit, and accordingly, the second electrode EL2 and the intermediate layer IML may have a divided shape in each light emitting unit. For example, the second electrode EL2 and the intermediate layer IML may be electrically independent for each adjacent pixel.

The separator SPR will be described in more detail with reference to FIGS. 5 and 6B. As illustrated in FIG. 6B, the separator SPR may have a reverse tapered shape. For example, an angle θ (hereinafter, referred to as a taper angle) between an upper surface of the pixel definition film PDL and a side surface SPR_W of the separator SPR may be an obtuse angle. However, this is only an example, the taper angle θ may be variously set as long as the separator SPR may electrically disconnect the second electrode EL2 for each pixel. Further, the separator SPR may have the same structure as that of the tip portion TP, but the disclosure is not limited to an embodiment.

In an embodiment, the separator SPR may include an insulating material, and particularly, may include an organic insulating material. The separator SPR may include an inorganic insulating material, may include a multi-layer structure of the organic insulating material and the inorganic insulating material, and may include a conductive material according to an embodiment. For example, as long as the second electrode EL2 may be electrically disconnected for each pixel, the type of material of the separator SPR is not particularly limited.

A dummy layer UP may be disposed on the separator SPR. The dummy layer UP may include a first dummy layer UP1 disposed on the separator SPR and a second dummy layer UP2 disposed on the first dummy layer UP1. The first dummy layer UP1 may be formed through the same process as that of the intermediate layer IML and include the same material as that of the intermediate layer IML. The second dummy layer UP2 may be formed through the same process as that of the second electrode EL2 and include the same material as that of the second electrode EL2. For example, the first dummy layer UP1 and the second dummy layer UP2 may be formed simultaneously while the intermediate layer IML and the second electrode EL2 are formed. In an embodiment, the display panel DP may not include the dummy layer UP.

As illustrated in FIG. 6B, in an embodiment, the second electrode EL2 may include a first end EN1*a*, and the second dummy layer UP2 may include a second end EN2*a*. The first end EN1*a* may be spaced apart from the separator SPR and positioned on the pixel definition film PDL, and the second end EN2*a* may be separated from the first end EN1*a* and positioned on the side surface SPR_W of the separator SPR. However, FIG. 6B illustrates that the first end EN1*a* is spaced apart from the side surface SPR_W of the separator SPR by a predetermined or selected distance, but the disclosure is not limited thereto, and the first end EN1*a* may be also in contact with the side surface SPR_W of the separator SPR as long as the first end EN1*a* is electrically disconnected from the second end EN2*a*. Further, even in case that the first end EN1*a* and the second end EN2*a* are connected without being distinguished from each other, in case that electrical resistance is high due to a small thickness of a portion of the separator SPR formed along the side surface SPR_W, and in case that the second electrode EL2 is electrically disconnected between adjacent pixels, it may be considered that the second electrode EL2 is divided by the separator SPR.

According to the disclosure, even in case that there is no separate patterning process for the second electrode EL2 or the intermediate layer IML, the second electrode EL2 or the intermediate layer IML is not formed on the side surface SPR_W of the separator SPR or is formed thin, and thus the second electrode EL2 or the intermediate layer IML may be divided for each pixel. Further, in case that the second electrode EL2 or the intermediate layer IML may be electrically disconnected between the adjacent pixels, the shape of the separator SPR may be variously deformed, but the disclosure is not limited to an embodiment.

Referring back to FIG. 5, the encapsulation layer ECL may be disposed on the light emitting element layer LDL. The encapsulation layer ECL may cover the light emitting element LD and cover the separator SPR. The encapsulation layer ECL may include a first inorganic layer IL1, an organic layer OL, and a second inorganic layer IL2 that are sequentially laminated. However, the disclosure is not limited thereto, and the encapsulation layer ECL may further include inorganic layers and organic layers. Further, the encapsulation layer ECL may be a glass substrate.

The first and second inorganic layers IL1 and IL2 may protect the light emitting element LD from moisture and oxygen outside the display panel DP, and the organic layer OL may protect the light emitting element LD from foreign substances such as particles remaining in a process of forming the first inorganic layer IL1. The first and second inorganic layers IL1 and IL2 may include a silicon nitride layer, a silicon oxynitride layer, a silicon oxide layer, a titanium oxide layer, an aluminum oxide layer, and/or the like. The organic layer OL may include an acryl-based organic layer, and the type of material is not particularly limited.

The detection layer ISL may detect an external input. In an embodiment, the detection layer ISL may be formed on the encapsulation layer ECL through a continuous process. It may be expressed that the detection layer ISL is directly disposed on the encapsulation layer ECL. The direct disposition may mean that there is no component between the detection layer ISL and the encapsulation layer ECL. For example, a separate adhesive member may not be disposed between the detection layer ISL and the encapsulation layer ECL. However, this is only an example, and in the display panel DP according to an embodiment of the disclosure, the detection layer ISL may be separately formed and coupled to the display panel DP through the adhesive member, but the disclosure is not limited to an embodiment.

The detection layer ISL may include conductive layers and insulating layers. The conductive layers may include a first detection conductive layer MTL1 and a second detection conductive layer MTL2, and the insulating layers may include first to third detection insulating layers 71, 72, and 73. However, this is only an example, and the numbers of the conductive layers and the insulating layers are not limited to an embodiment.

The first to third detection insulating layers 71, 72, and 73 may have a single-layer structure or a multi-layer structure in which multiple layers are laminated in the third direction DR3. The first to third detection insulating layers 71, 72, and 73 may include an inorganic film. The inorganic film may include at least one of an aluminum oxide, a titanium oxide, a silicon oxide, a silicon nitride, a silicon oxynitride, a zirconium oxide, and a hafnium oxide. The first to third detection insulating layers 71, 72, and 73 may include an organic film. The organic film may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

The first detection conductive layer MTL1 may be disposed between the first detection insulating layer 71 and the second detection insulating layer 72, and the second detection conductive layer MTL2 may be disposed between the second detection insulating layer 72 and the third detection insulating layer 73. A portion of the second detection conductive layer MTL2 may be connected to the first detection conductive layer MTL1 through a contact hole CNT formed in the second detection insulating layer 72. The first detection conductive layer MTL1 and the second detection conductive layer MTL2 may have a single-layer structure or a multi-layer structure in which multiple layers are laminated in the third direction DR3.

The detection conductive layer having the single-layer structure may include a metal layer or a transparent conductive layer. The metal layer may include molybdenum, silver, titanium, copper, aluminum, and/or alloys thereof. The transparent conductive layer may include a transparent conductive oxide such as indium tin oxide (ITO), indium zinc oxide (IZO), zinc oxide (ZnO), and/or indium zinc tin oxide (IZTO). In other embodiments, the transparent conductive layer may include conductive polymer such as PEDOT, metal nanowire, graphene, and/or the like.

The detection conductive layer having the multi-layer structure may include metal layers. For example, the metal layers may have a three-layer structure of titanium (Ti)/aluminum (Al)/titanium (Ti). In other embodiments, the conductive layer having the multi-layer structure may include at least one metal layer and at least one transparent conductive layer.

The first detection conductive layer MTL1 and the second detection conductive layer MTL2 may constitute a sensor that detects an external input in the detection layer ISL. The sensor may be driven in a capacitive method and may be driven in any one of a mutual capacitive method and a self-capacitive method. However, this is only an example, and the sensor may be driven by a resistive film method, an ultrasonic method, or an infrared method in addition to the capacitive method, but the disclosure is not limited to an embodiment.

The first detection conductive layer MTL1 and the second detection conductive layer MTL2 may include a transparent conductive oxide or may have a shape of a metal mesh formed of an opaque conductive material. The first detection conductive layer MTL1 and the second detection conductive layer MTL2 may have various materials and various shapes as long as the visibility of the image displayed by the display panel DP is not degraded, and the disclosure is not limited to an embodiment.

Figure 7:
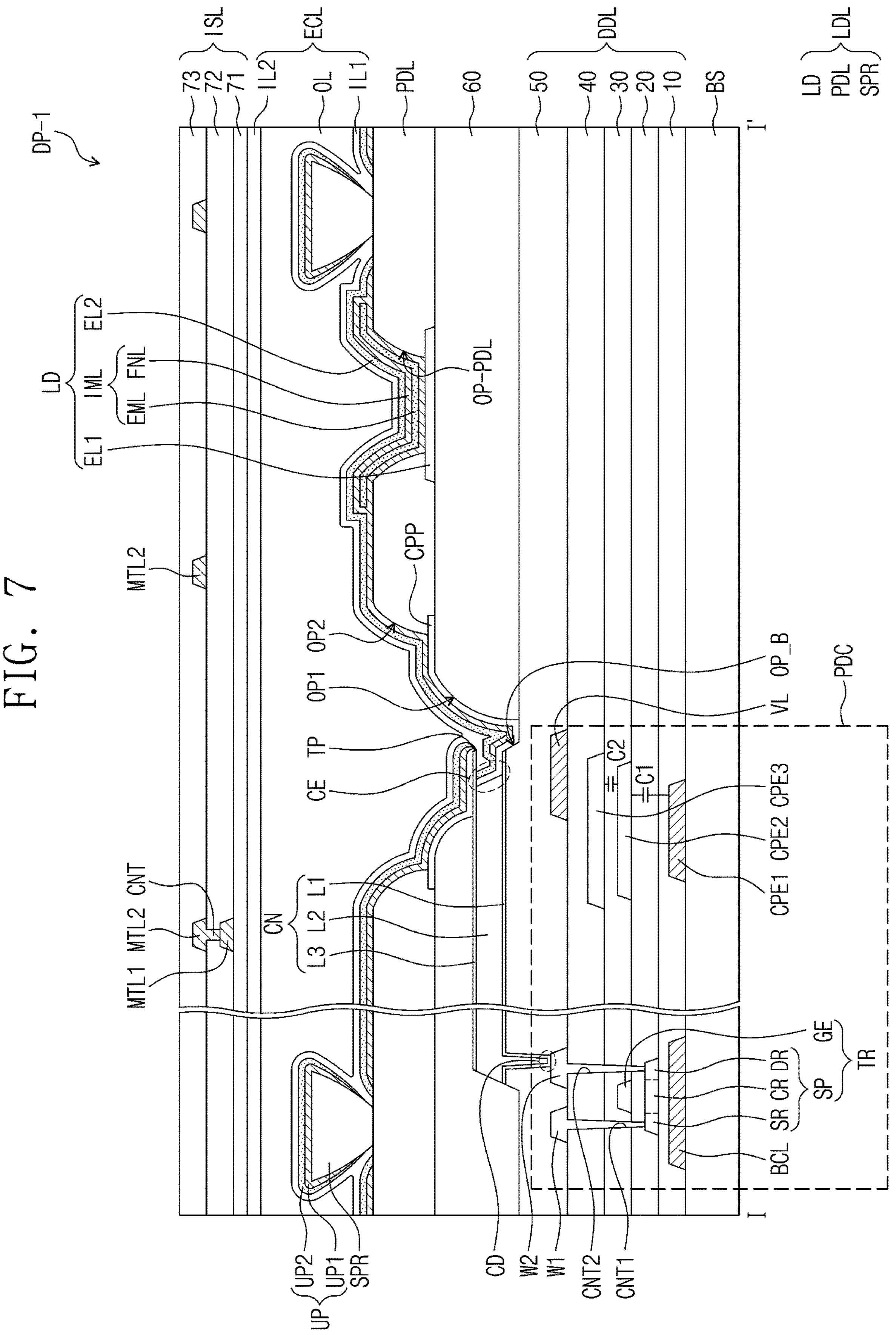
FIG. 7 is a schematic cross-sectional view of the display panel according to an embodiment of the disclosure.

FIG. 7 is a schematic cross-sectional view of the display panel according to an embodiment of the disclosure. For easy description, FIG. 7 is a cross-sectional view illustrating an area corresponding to FIG. 5. Hereinafter, the same reference numerals are assigned to the same components as those described with reference to FIGS. 1 to 6B, and a duplicated description thereof will be omitted.

A display panel DP-1 illustrated in FIG. 7 may further include a capping pattern CPP as compared to the display panel DP illustrated in FIG. 5. The capping pattern CPP may be disposed on the connection transistor TR. In detail, the capping pattern CPP may be disposed on the sixth insulating layer 60. Further, the capping pattern CPP may also be disposed on a partial area of the connection wiring line CN, which is exposed by the first opening OP1 of the sixth insulating layer 60. The capping pattern CPP may be disposed to overlap the connection wiring line CN, and specifically, may be disposed to overlap the light emitting connection part CE and/or the tip portion TP.

Further, as illustrated in FIG. 7, when viewed on a cross section, the capping pattern CPP may have a partially disconnected shape with respect to the tip portion TP in the area in which the light emitting connection part CE is defined. However, in plan view, the capping pattern CPP may have an integral shape connected as a whole within the area (see FIG. 4) defined as a closed line by the separator SPR. One end of the partially disconnected capping pattern CPP may be in contact with a side surface of the second layer L2 of the connection wiring line CN, and the other end of the capping pattern CPP may be disposed on the third layer L3 of the connection wiring line CN to cover the tip portion TP.

The capping pattern CPP may include a conductive material. Accordingly, the second electrode EL2 may be electrically connected to the connection wiring line CN through the capping pattern CPP. For example, the capping pattern CPP is in contact with the side surface of the second layer L2 of the connection wiring line CN, the second electrode EL2 is in contact with the capping pattern CPP, and thus both the second layer L2 and the second electrode EL2 may be electrically connected. The capping pattern CPP may be disposed relatively outside the second layer L2 of the connection wiring line CN, the second electrode EL2 may be electrically connected to the second layer L2 only by being connected to the capping pattern CPP instead of the side surface of the second layer, and thus the connection wiring line CN and the second electrode EL2 may be more easily connected.

Further, the capping pattern CPP may include a material having a relatively low reactivity as compared to the second layer L2 of the connection wiring line CN. For example, the capping pattern CPP may include copper (Cu), silver (Ag), a transparent conductive oxide, and/or the like. As the side surface of the second layer L2 of the connection wiring line CN is protected by the capping pattern CPP having a relatively low reactivity, oxidation of materials included in the second layer L2 may be prevented. Further, in an etching process of patterning the first electrode EL1, a silver (Ag) component included in the first electrode EL1 may be reduced, and thus a phenomenon in which the silver component remains as particles causing defects may be prevented.

In an embodiment, the capping pattern CPP may be formed through the same process as that of the first electrode EL1 and may include the same material as that of the first electrode EL1. However, this is only an example, and the capping pattern CPP may be formed through a process different from that of the first electrode EL1 or may include a different material, but the disclosure is not limited to an embodiment.

Figure 8:
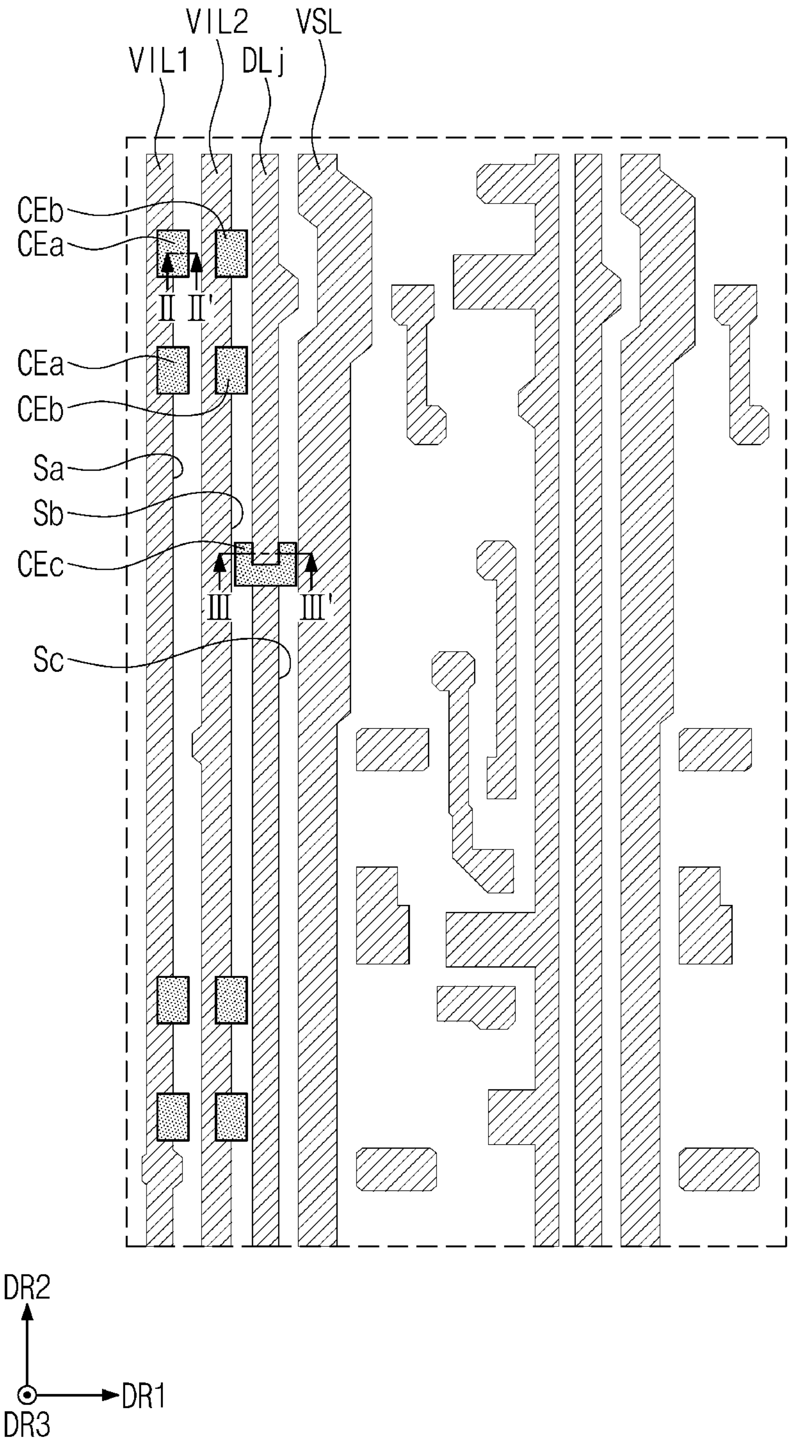
FIG. 8 is a schematic plan view illustrating voltage lines and first connection parts according to an embodiment of the disclosure.

FIG. 8 is a schematic plan view illustrating voltage lines VL and first connection parts CEa, CEb, and CEc according to an embodiment of the disclosure.

Referring to FIG. 8, each of the voltage lines VL (see FIG. 5) may include a width parallel to the first direction DR1 and sides Sa, Sb, or Sc extending in the second direction DR2 intersecting the first direction DR1. The first connection part CEa, CEb, or CEc may overlap the side Sa, Sb, or Sc of one voltage line among the voltage lines VL in plan view. For example, the first initialization voltage line VIL1 may include the side Sa extending in the second direction DR2, and the first connection part CEa may overlap the side Sa of the first initialization voltage line VIL1 in plan view. The second initialization voltage line VIL2 may include the side Sb extending in the second direction DR2, and the first connection part CEb may overlap the side Sb of the second initialization voltage line VIL2 in plan view. The data line DLj may include the side Sc extending in the second direction DR2, and the first connection part CEc may overlap the side Sc of the data line DLj in plan view.

FIG. 8 illustratively illustrates the first initialization voltage line VIL1, the second initialization voltage line VIL2, the data line DLj, and the second power line VSL, but the disclosure is not limited thereto. The voltage line may be one of the first power line VDL (see FIG. 2A), the second power line VSL (see FIG. 2A), the third power line (or the reference voltage line VRL; see FIG. 2A), the fourth power line (or the first initialization voltage line VIL1; see FIG. 2A), the fifth power line (or the second initialization voltage line VIL2; see FIG. 2A), the sixth power line (or the compensation voltage line VCL; see FIG. 2A), and the data line DLj (see FIG. 2A).

The first connection part CEa, CEb, or CEc may have various shapes. In FIG. 8, the shape of the first connection part CEa, CEb, or CEc is illustratively illustrated as a quadrangular shape or concave polygonal shape, but the disclosure is not limited thereto. Further, FIG. 8 illustratively illustrates the eight first connection parts CEa and CEb having a quadrangular shape and the one first connection part CEc having a concave polygonal shape, but the disclosure is not limited thereto. The shapes and numbers of the first connection parts CEa, CEb, or CEc may change according to an internal structure of the display panel DP or DP-1 (see FIG. 5 or 7).

Figure 9A:
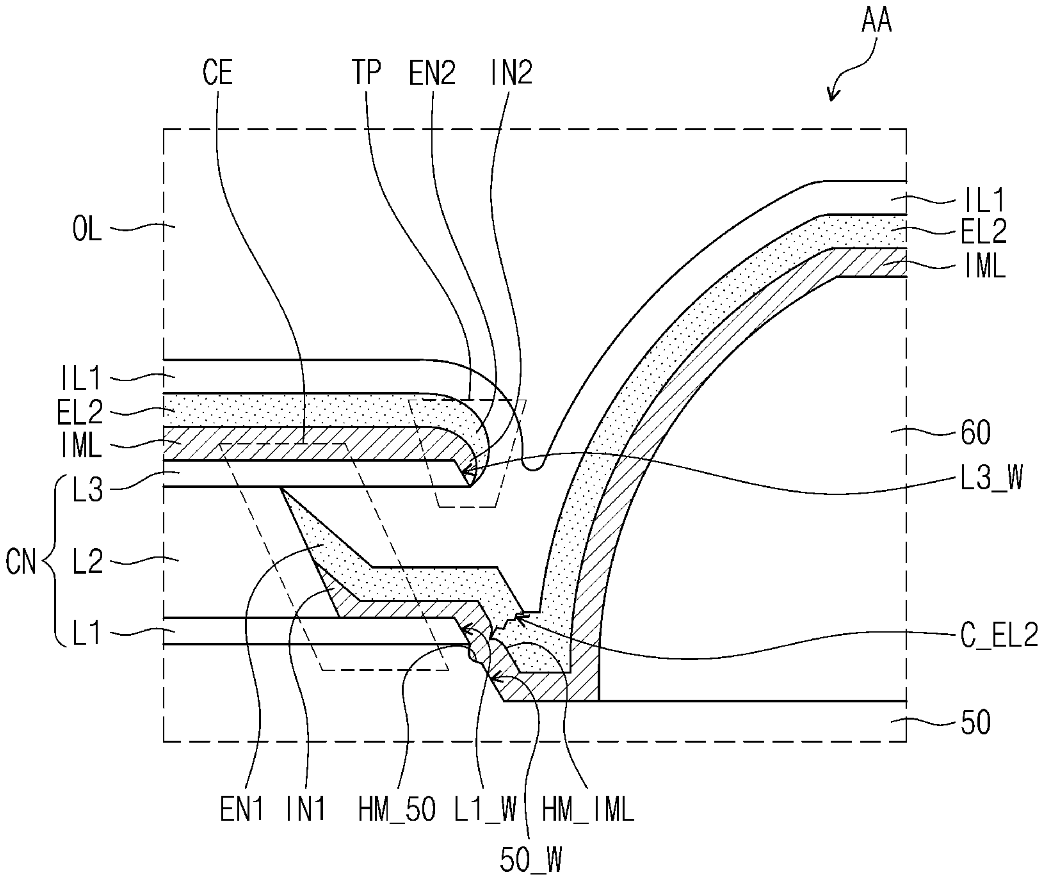
FIG. 9A is an enlarged schematic cross-sectional view of a partial area of a display panel according to the related art.

FIG. 9A is an enlarged schematic cross-sectional view of a partial area of a display panel according to the related art. FIG. 9A is an enlarged cross section corresponding to FIG. 5. In description of FIG. 9A, the description will be made with reference to FIGS. 1 to 7, and a description for the same reference numerals will be omitted.

Referring to FIG. 9A, a groove HM_50 may be formed in the lower insulating layer 50 (or the fifth insulating layer). The groove HM_50 may be a recessed portion of a side surface 50_W of the lower insulating layer 50. In case that the groove HM_50 is formed under the lower insulating layer 50, the voltage lines VL (see FIG. 5) may not be arranged under the lower insulating layer 50.

A groove HM_IML may be formed in the intermediate layer IML disposed on the lower insulating layer 50. The groove HM_IML of the intermediate layer IML may be formed by the groove HM_50 of the lower insulating layer 50. The groove HM_IML of the intermediate layer IML may be formed in an area adjacent to the groove HM_50 of the lower insulating layer 50.

A crack C_EL2 may occur in the second electrode EL2 disposed on the intermediate layer IML. The crack C_EL2 of the second electrode EL2 may be formed by the groove HM_IML of the intermediate layer IML. The crack C_EL2 of the second electrode EL2 may be formed in the area adjacent to the groove HM_50 of the lower insulating layer 50. As the crack C_EL2 occurs in the second electrode EL2, the second electrode EL2 may not be smoothly connected to the connection wiring line CN. As a result, a defect may occur in the electrical connection between the second electrode EL2 and the connection transistor TR (see FIG. 5).

Figure 9B:
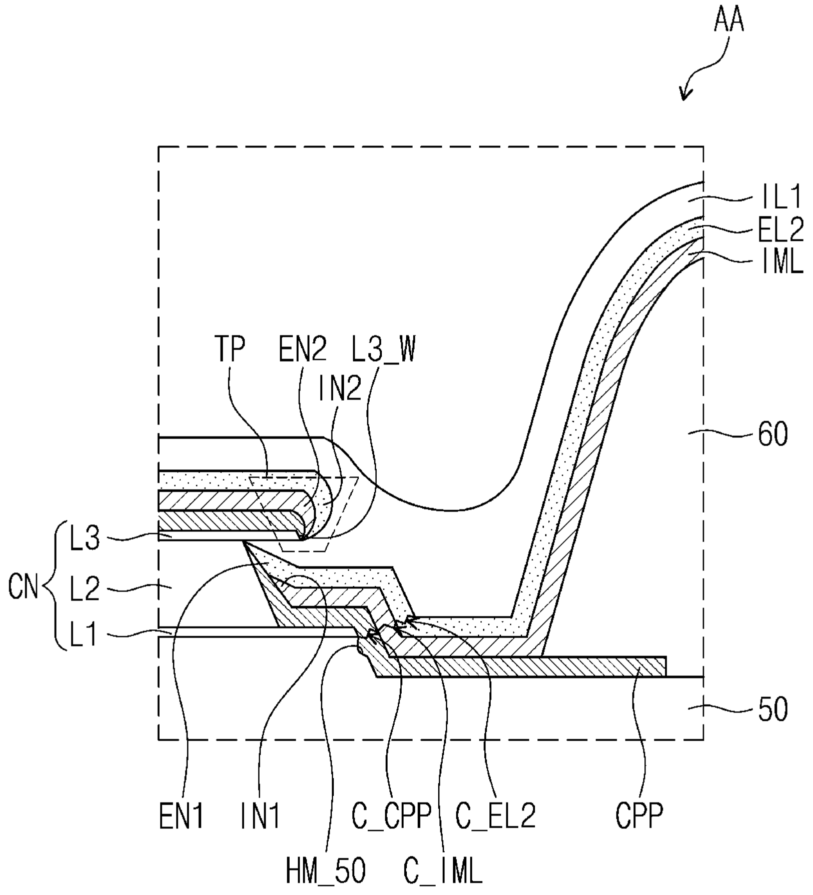
FIG. 9B is an enlarged schematic cross-sectional view of the partial area of the display panel according to the related art.

FIG. 9B is an enlarged schematic cross-sectional view of the partial area of the display panel according to the related art. FIG. 9B is an enlarged cross section corresponding to FIG. 7. In description of FIG. 9B, the description will be made with reference to FIGS. 1 to 7, and a description for the same reference numerals will be omitted.

Referring to FIG. 9B, the groove HM_50 may be formed in the lower insulating layer 50 (or the fifth insulating layer). The groove HM_50 may be a recessed portion of the side surface 50_W of the lower insulating layer 50. In case that the groove HM_50 is formed under the lower insulating layer 50, the voltage lines VL (see FIG. 7) may not be arranged under the lower insulating layer 50.

A crack C_CPP may occur in the capping pattern CPP disposed on the lower insulating layer 50. The crack C_CPP of the capping pattern CPP may be formed by the groove HM_50 of the lower insulating layer 50. The crack C_CPP of the capping pattern CPP may be formed in the area adjacent to the groove HM_50 of the lower insulating layer 50.

A crack C_IML may also occur in the intermediate layer IML disposed on the capping pattern CPP. The crack C_IML of the intermediate layer IML may be formed by the crack C_CPP of the capping pattern CPP. The crack C_IML of the intermediate layer IML may be formed in the area adjacent to the groove HM_50 of the lower insulating layer 50.

The crack C_EL2 may occur in the second electrode EL2 disposed on the intermediate layer IML. The crack C_EL2 of the second electrode EL2 may be formed by the crack C_IML of the intermediate layer IML. The crack C_EL2 of the second electrode EL2 may be formed in the area adjacent to the groove HM_50 of the lower insulating layer 50. As the crack C_EL2 occurs in the second electrode EL2, the second electrode EL2 may not be smoothly connected to the connection wiring line CN. As a result, a defect may occur in the electrical connection between the second electrode EL2 and the connection transistor TR (see FIG. 5).

Figure 10:
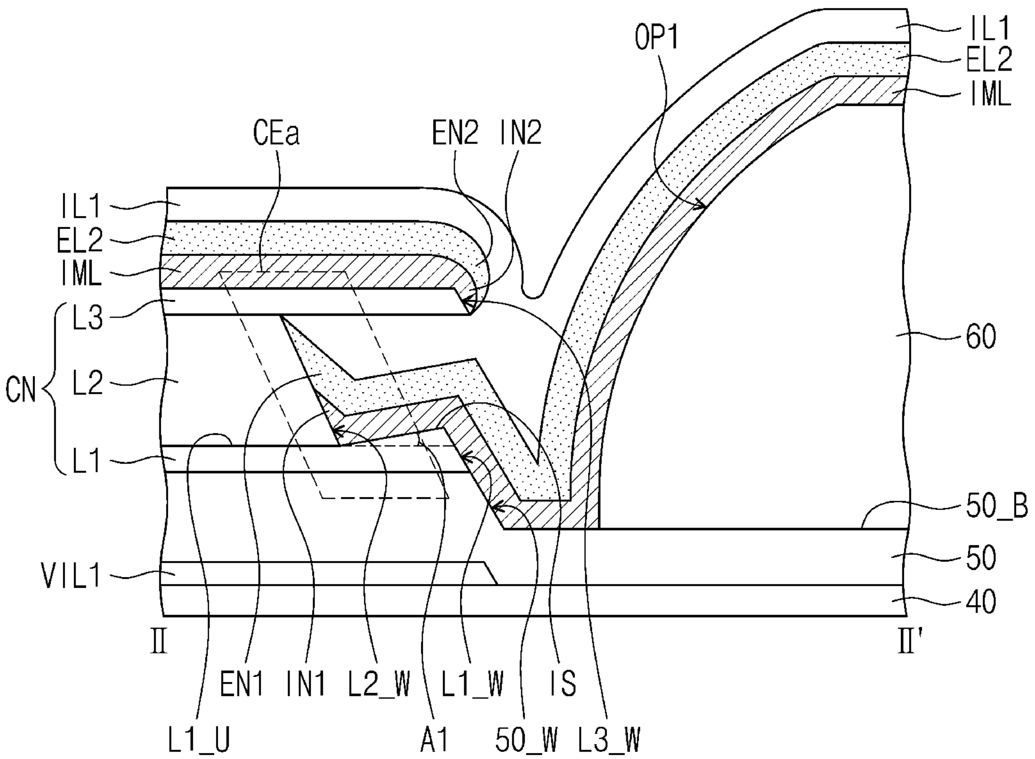
FIG. 10 is a schematic cross-sectional view along line II-II' of FIG. 8.

FIG. 10 is a schematic cross-sectional view along line II-II' of FIG. 8. FIG. 10 is an enlarged cross-sectional view of a portion of the display panel DP (see FIG. 5) from which the capping pattern CPP (see FIG. 7) is omitted. The description of FIG. 10 may be equally applied to the display panel DP-1 (see FIG. 7) including the capping pattern CPP.

Referring to FIGS. 4A, 5, 8, and 10, the light emitting connection part CEa (or the first connection part) may include multiple side surfaces. In FIG. 10, one side surface among multiple side surfaces of the first opening OP1 may be exposed. The second electrode EL2 may be connected to the exposed one side surface among the side surfaces. Voltage lines VL may be arranged on the fourth insulating layer 40. Some of the voltage lines VL may overlap the light emitting connection part CEa in plan view. FIG. 10 illustratively illustrates the first initialization voltage line VIL1 disposed on the fourth insulating layer 40, but the disclosure is not limited thereto. For example, the first power line VDL (see FIG. 2A), the second power line VSL (see FIG. 2A), the third power line (or the reference voltage line VRL; see FIG. 2A), the fifth power line (or the second initialization voltage line VIL2; see FIG. 2A), the sixth power line (or the compensation voltage line VCL; see FIG. 2A), or the data line DLj (see FIG. 2A) may be arranged on the fourth insulating layer 40.

The first layer L1 may include an upper surface L1_U, an inclined surface IS, and the side surface L1_W (hereinafter, referred to as a first side surface). The upper surface L1_U of the first layer L1 may be parallel to the base layer BS. The inclined surface IS of the first layer L1 may extend from the upper surface L1_U and may be inclined with respect to the base layer BS. The inclined surface IS may be inclined by a first angle A1 from the upper surface L1_U of the first layer L1. The first angle A1 may exceed 0 degree. The first side surface L1_W of the first layer L1 may extend from the inclined surface IS and may be connected to the lower insulating layer 50.

The lower insulating layer 50 may include a lower surface 50_B and the side surface 50_W (hereinafter, referred to as a second side surface). The lower surface 50_B of the lower insulating layer 50 may be parallel to the base layer BS. The second side surface 50_W of the lower insulating layer 50 may extend from the lower surface 50_B and may be connected to the connection wiring line CN. In detail, the second side surface 50_W of the lower insulating layer 50 may be connected to the first layer L1 of the connection wiring line CN. The second side surface 50_W of the lower insulating layer 50 and the first side surface L1_W of the first layer L1 of the connection wiring line CN may be aligned with each other.

According to the disclosure, as some of the voltage lines VL and the light emitting connection part CEa overlap each other in plan view, the density of the lower insulating layer 50 overlapping the voltage lines VL may increase, and a portion of the lower insulating layer 50 may be thickened. Thus, the groove HM_50 (see FIG. 9A) may not be formed in the lower insulating layer 50, and the first layer L1 of the connection wiring line CN disposed on the lower insulating layer 50 may include the inclined surface IS. As a result, the crack C_EL2 (see FIG. 9A) may not occur in the second electrode EL2, and the second electrode EL2 may be smoothly connected to the connection wiring line CN. A connection defect between the second electrode EL2 and the connection transistor TR may be reduced, and the display device DD (see FIG. 1) having improved afterimage defects may be provided.

Figure 11:
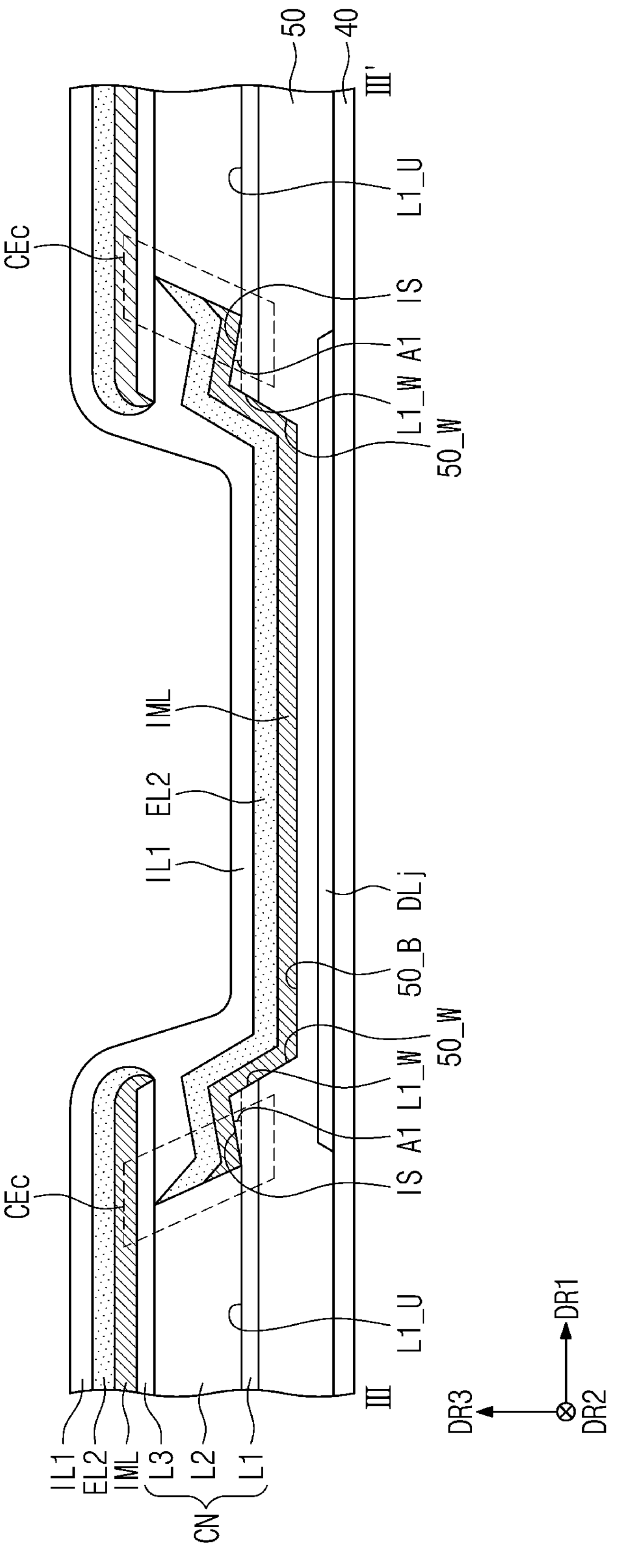
FIG. 11 is a schematic cross-sectional view along line III-III' of FIG. 8.

FIG. 11 is a schematic cross-sectional view along line III-III' of FIG. 8. FIG. 11 is an enlarged cross-sectional view of a portion of the display panel DP (see FIG. 5) from which the capping pattern CPP (see FIG. 7) is omitted. The description of FIG. 11 may be equally applied to the display panel DP-1 (see FIG. 7) including the capping pattern CPP.

Referring to FIGS. 4A, 5, 8, and 11, the light emitting connection part CEc (or the first connection part) may include multiple side surfaces. In FIG. 11, two side surfaces among the side surfaces of the first opening OP1 may be exposed. The two side surfaces may be spaced apart from each other in the first direction and extend in the second direction DR2. The second electrode EL2 may be connected to the exposed two side surfaces among the side surfaces. Voltage lines VL may be arranged on the fourth insulating layer 40. Some of the voltage lines VL may overlap the light emitting connection part CEc in plan view. FIG. 11 illustratively illustrates the data line DLj (see FIG. 2A) disposed on the fourth insulating layer 40, but the disclosure is not limited thereto. For example, the first power line VDL (see FIG. 2A), the second power line VSL (see FIG. 2A), the third power line (or the reference voltage line VRL; see FIG. 2A), the fourth power line (or the first initialization voltage line VIL1; see FIG. 2A), the fifth power line (or the second initialization voltage line VIL2; see FIG. 2A), or the sixth power line (or the compensation voltage line VCL; see FIG. 2A) may be arranged on the fourth insulating layer 40.

The first layer L1 may include the upper surface L1_U, the inclined surface IS, and the side surface L1_W (hereinafter, referred to as a first side surface). The upper surface L1_U of the first layer L1 may be parallel to the base layer BS. The inclined surface IS of the first layer L1 may extend from the upper surface L1_U and may be inclined with respect to the base layer BS. The inclined surface IS may be inclined by the first angle A1 from the upper surface L1_U of the first layer L1. The first angle A1 may exceed 0 degree. The first side surface L1_W of the first layer L1 may extend from the inclined surface IS and may be connected to the lower insulating layer 50.

The lower insulating layer 50 may include the lower surface 50_B and the side surface 50_W (hereinafter, referred to as a second side surface). The lower surface 50_B of the lower insulating layer 50 may be parallel to the base layer BS. The second side surface 50_W of the lower insulating layer 50 may extend from the lower surface 50_B and may be connected to the connection wiring line CN. In detail, the second side surface 50_W of the lower insulating layer 50 may be connected to the first layer L1 of the connection wiring line CN. The second side surface 50_W of the lower insulating layer 50 and the first side surface L1_W of the first layer L1 of the connection wiring line CN may be aligned with each other.

According to the disclosure, as some of the voltage lines VL and the light emitting connection part CEc overlap each other in plan view, the density of the lower insulating layer 50 overlapping the voltage lines VL increases, and a portion of the lower insulating layer 50 may be thickened. Thus, the groove HM_50 (see FIG. 9A) may not be formed in the lower insulating layer 50, and the first layer L1 of the connection wiring line CN disposed on the lower insulating layer 50 may include the inclined surface IS. As a result, the crack C_EL2 (see FIG. 9A) may not occur in the second electrode EL2, and the second electrode EL2 may be smoothly connected to the connection wiring line CN. The connection defect between the second electrode EL2 and the connection transistor TR may be reduced, and the display device DD (see FIG. 1) having improved afterimage defects may be provided.

FIGS. 10 and 11 illustratively illustrate that one side surface and two side surfaces of the side surfaces of the light emitting connection part CEa or CEc are exposed, but the disclosure is not limited thereto. For example, three or more side surfaces among the side surfaces of the light emitting connection part may be exposed.

As described above, as some of multiple voltage lines and a light emitting connection part overlap each other in plan view, the density of a lower insulating layer overlapping the voltage lines may increase, and a portion of the lower insulating layer may be thickened. Thus, a groove may not be formed in the lower insulating layer, and a first layer of a connection wiring line disposed on the lower insulating layer may include an inclined surface. As a result, a crack may not occur in a second electrode, and the second electrode may be smoothly connected to the connection wiring line. A connection defect between the second electrode and a connection transistor may be reduced, and the display device having improved afterimage defects may be provided.

Although the description has been made above with reference to embodiments of the disclosure, it may be understood that those skilled in the art may variously modify and change the embodiments without departing from the spirit and technical scope of the disclosure. Accordingly, the technical scope of the disclosure is not limited to the detailed description of the specification.

What is claimed is:

1. A display device, comprising:
a base layer;
a plurality of voltage lines and a transistor that are disposed on the base layer;
a light emitting element electrically connected to the transistor and including a cathode;
a pixel defining layer disposed on an anode of the light emitting element, the pixel defining layer including a light emitting opening formed in the pixel defining layer; and
a connection wiring line electrically connected to the light emitting element and including:
a first connection part spaced apart from the light emitting opening; and
a second connection part electrically connected to the transistor, wherein
the transistor supplies a driving current to the light emitting element via the connection wiring line, and
the first connection part overlaps some of the plurality of voltage lines in plan view.

2. The display device of claim 1, further comprising:
a capping pattern disposed on the transistor and electrically contacting the connection wiring line, wherein
the cathode of the light emitting element extends over the pixel defining layer to directly contact at least one of the capping pattern and the connection wiring line at the first connection part, and
at least one of the capping pattern and the cathode make direct contact with a bottom surface of the connection wiring line that faces the base layer.

3. The display device of claim 1, wherein the plurality of voltage lines include:
a first power line;
a second power line;
a reference voltage line;
a first initialization power line;
a second initialization power line;
a compensation voltage line; and
a data line.

4. The display device of claim 1, wherein
each of the plurality of voltage lines has a width parallel to a first direction, each of the plurality of voltage lines includes a side extending in a second direction intersecting the first direction, and the first connection part overlaps the side of one voltage line among the plurality of voltage lines in plan view.

5. An electronic device, comprising:

the display device of claim 1.

6. A display device, comprising:

a base layer;

a plurality of voltage lines and a transistor that are disposed on the base layer;

a light emitting element electrically connected to the transistor and including a cathode; and a connection wiring line electrically connected to the light emitting element and including:

a first connection part spaced apart from a light emitting opening defined in the light emitting element; and a second connection part electrically connected to the transistor, wherein the first connection part overlaps some of the plurality of voltage lines in plan view, the connection wiring line includes:

a first layer;

a second layer disposed on the first layer; and a third layer disposed on the second layer, the third layer includes a tip portion protruding from a side surface of the second layer, and the cathode is electrically disconnected by the tip portion.

7. The display device of claim 6, wherein the first connection part includes a plurality of side surfaces, and at least one side surface of the plurality of side surfaces is electrically connected to the cathode.

8. The display device of claim 7, further comprising:

a lower insulating layer which is disposed on the transistor and in which a lower opening that does not overlap the connection wiring line is defined in plan view.

9. The display device of claim 8, wherein the first layer includes:

an upper surface parallel to the base layer;

an inclined surface extending from the upper surface and inclined with respect to the base layer; and a first side surface extending from the inclined surface and extended to the lower insulating layer.

10. The display device of claim 9, wherein the lower insulating layer includes:

a lower surface parallel to the base layer; and a second side surface extending from the lower surface and extended to the connection wiring line, and the second side surface of the lower insulating layer and the first side surface of the first layer of the connection wiring line are aligned with each other.

11. The display device of claim 9, further comprising:

an upper insulating layer which is disposed on the lower insulating layer and in which a first opening overlapping the at least one side surface is defined.

12. The display device of claim 11, wherein one side surface among the plurality of side surfaces is exposed through the first opening.

13. The display device of claim 11, wherein two side surfaces among the plurality of side surfaces are exposed through the first opening, and the two side surfaces are spaced apart from each other in a first direction and extend in a second direction intersecting the first direction.

14. A display device, comprising:

a base layer;

a plurality of voltage lines and a transistor that are disposed on the base layer;

a light emitting element electrically connected to the transistor and including a cathode;

a connection wiring line electrically connected to the transistor and the light emitting element and including:

a first layer;

a second layer disposed on the first layer; and a third layer disposed on the second layer; and a lower insulating layer which is disposed on the transistor and in which a lower opening that does not overlap the connection wiring line in plan view is defined, wherein the third layer includes a tip portion protruding from a side surface of the second layer, and the first layer includes:

an upper surface parallel to the base layer;

an inclined surface extending from the upper surface and inclined with respect to the base layer, and a first side surface extending from the inclined surface and extended to the lower insulating layer.

15. The display device of claim 14, wherein the lower insulating layer includes:

a lower surface parallel to the base layer; and a second side surface extending from the lower surface and extended to the connection wiring line, and the second side surface of the lower insulating layer and the first side surface of the first layer of the connection wiring line are aligned with each other.

16. The display device of claim 14, wherein the connection wiring line includes:

a first connection part spaced apart from a light emitting opening defined in the light emitting element; and a second connection part electrically connected to the transistor, and the first connection part includes a plurality of side surfaces, at least one side surface among the plurality of side surfaces is electrically connected to the cathode.

17. The display device of claim 16, further comprising:

an upper insulating layer which is disposed on the lower insulating layer and in which a first opening overlapping the at least one side surface is defined.

18. The display device of claim 17, wherein one side surface among the plurality of side surfaces is exposed through the first opening.

19. The display device of claim 17, wherein two side surfaces among the plurality of side surfaces are exposed through the first opening, and the two side surfaces are spaced apart from each other in a first direction and extend in a second direction intersecting the first direction.

20. The display device of claim 16, wherein each of the plurality of voltage lines has a width parallel to a first direction, each of the plurality of voltage lines includes a side extending in a second direction intersecting the first direction, and the first connection part overlaps the side of one voltage line among the plurality of voltage lines in plan view.

21. The display device of claim 16, wherein the first connection part overlaps some of the plurality of voltage lines in plan view.

* * * * *